United States Patent [19]

Nakaoka

[11] Patent Number: 5,687,000
[45] Date of Patent: Nov. 11, 1997

[54] COLORANT-AMOUNT TRANSFORMING METHOD

[75] Inventor: Ikuo Nakaoka, Tokyo, Japan

[73] Assignee: Toyo Ink Manufacturing Co., Ltd., Tokyo, Japan

[21] Appl. No.: 520,760

[22] Filed: Aug. 29, 1995

[30] Foreign Application Priority Data

| Mar. 24, 1995 | [JP] | Japan | 7-065693 |
| Mar. 24, 1995 | [JP] | Japan | 7-065694 |
| Mar. 24, 1995 | [JP] | Japan | 7-065695 |

[51] Int. Cl.[6] .................. H04N 1/23; H04N 1/46; H04N 1/60
[52] U.S. Cl. .................. 358/296; 358/518; 382/167
[58] Field of Search .................. 358/296, 298, 358/500, 501, 503, 504, 515, 518–521, 523–525, 530, 534; 382/162, 167; 347/106, 172, 183, 184

[56] References Cited

U.S. PATENT DOCUMENTS

| 5,471,324 | 11/1995 | Rolleston | 358/518 |
| 5,539,540 | 7/1996 | Spaulding et al. | 358/518 |
| 5,579,031 | 11/1996 | Liang | 345/154 |

FOREIGN PATENT DOCUMENTS

| 2-217854 | 8/1990 | Japan | H04N 1/46 |
| 2-241271 | 9/1990 | Japan | H04N 1/46 |
| 4-83471 | 3/1992 | Japan | H04N 1/40 |

*Primary Examiner*—Eric Frahm
*Attorney, Agent, or Firm*—Knobbe, Martens, Olson & Bear LLP

[57] ABSTRACT

A colorant-amount transforming method for transforming a first colorant amount for forming an image on a first medium into a second colorant amount for forming the image on a second medium whose colorimetric value differs from that of the first medium. The first colorant amount is transformed into a colorimetric value by a first transformation for transforming the first colorant amount into a colorimetric value corresponding to a tristimulus value (or a spectral reflectance) in which a portion of contribution of the tristimulus value (spectral reflectance) of the first medium itself to the tristimulus value (spectral reflectance) of the image formed on the first medium with the first colorant amount is replaced by the tristimulus value (spectral reflectance) of the second medium itself in accordance with a contribution rate. The colorimetric value obtained in the first transformation is transformed into the second colorant amount by a second transformation for transforming the colorimetric value of the image formed on the second medium into the second colorant amount.

15 Claims, 20 Drawing Sheets

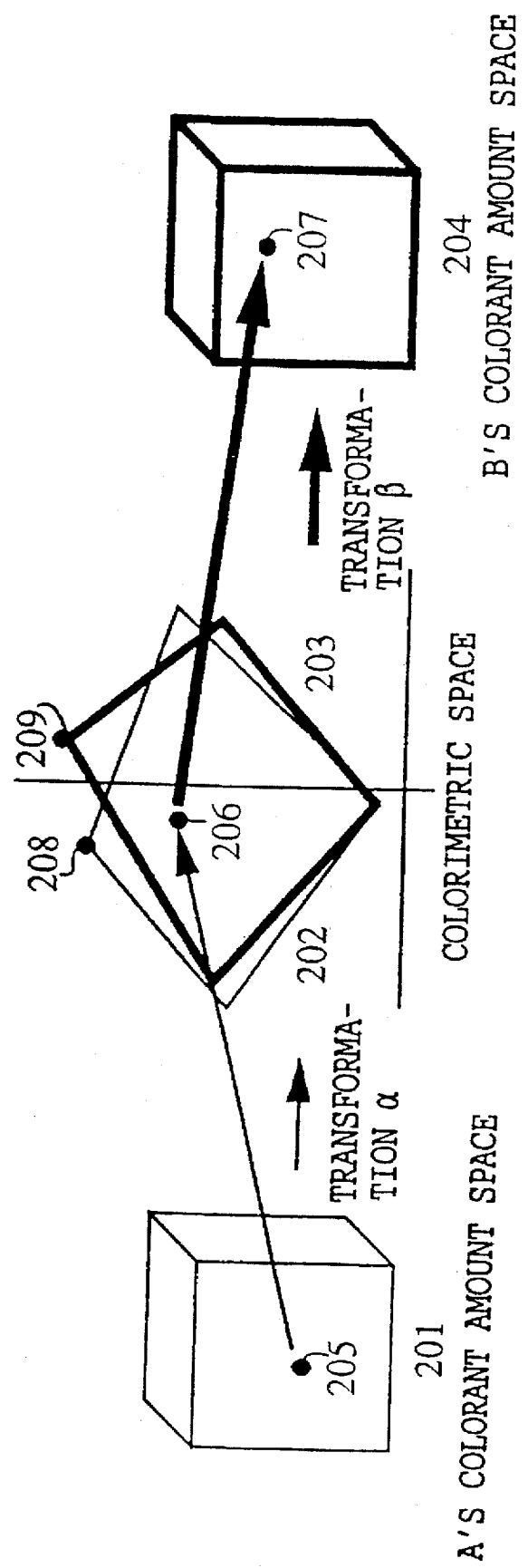

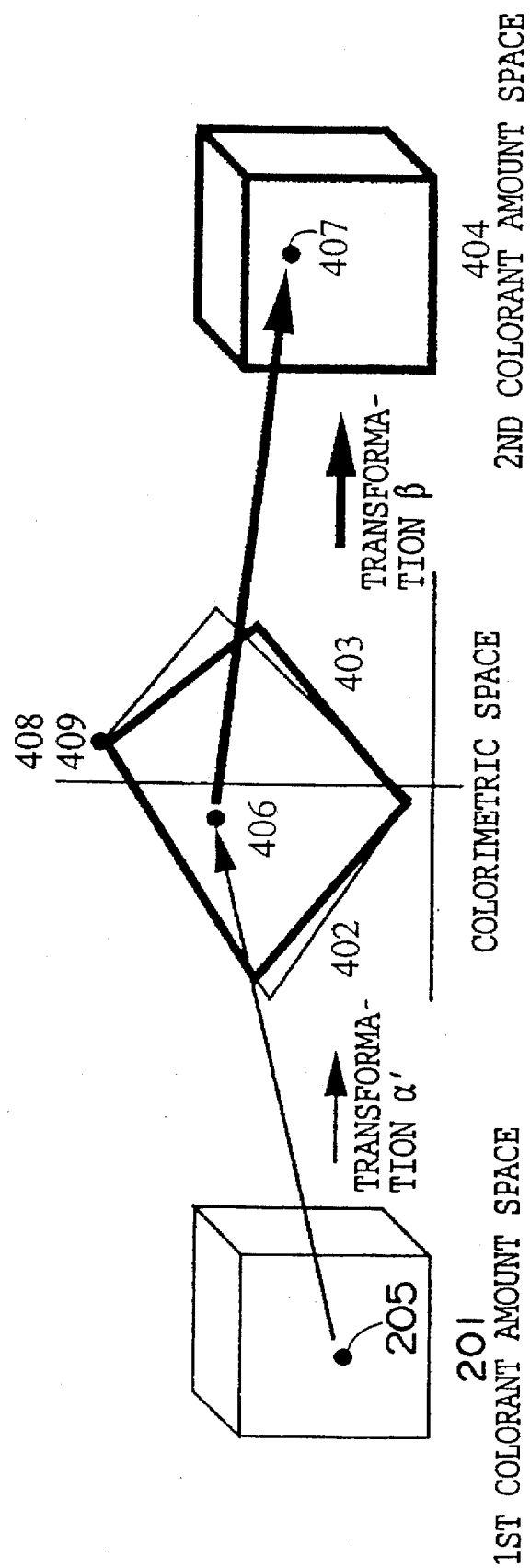

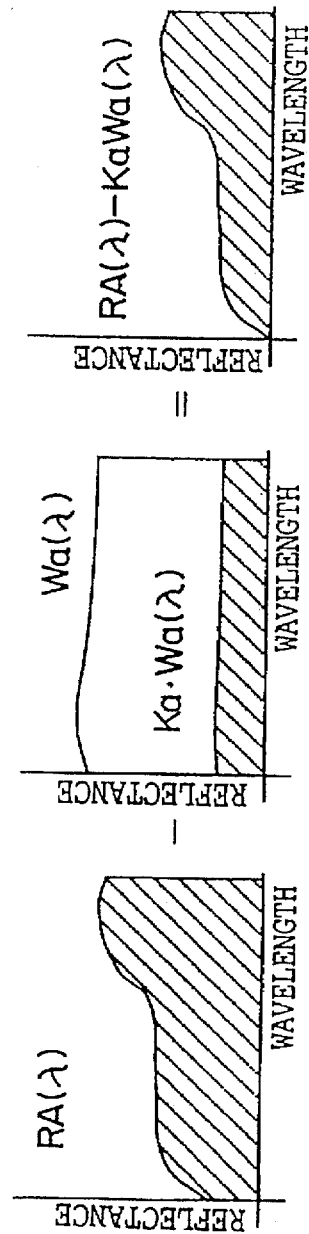
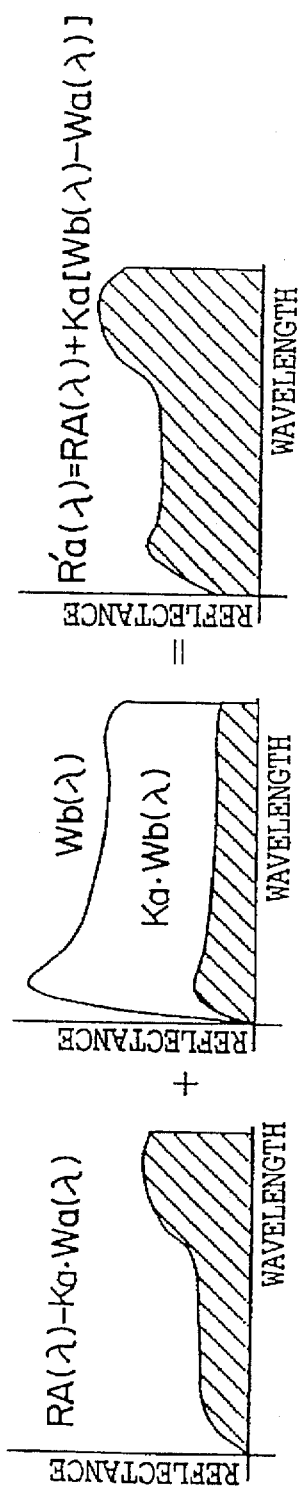
FIG. 7A
FIG. 7B

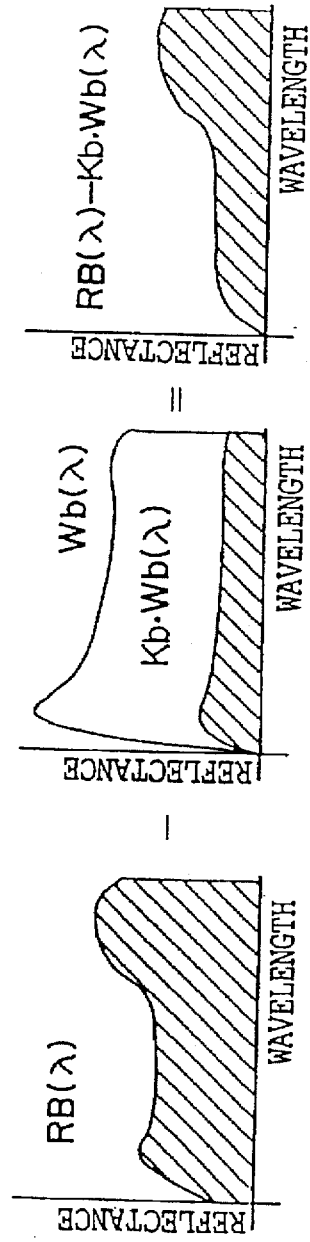
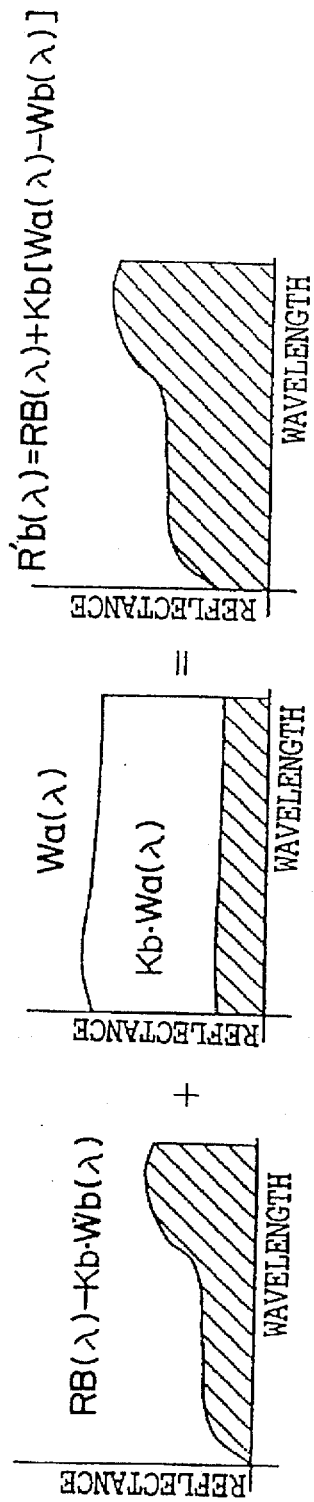
FIG. 8A
FIG. 8B

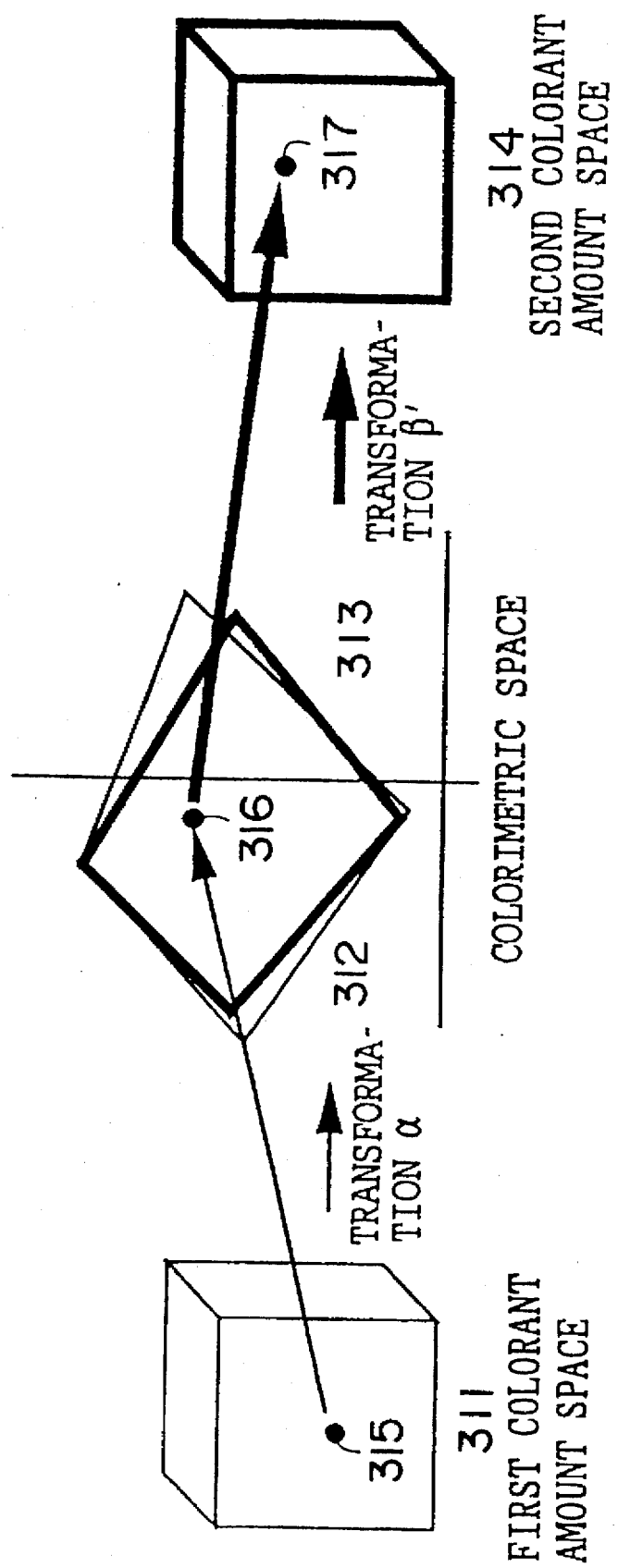

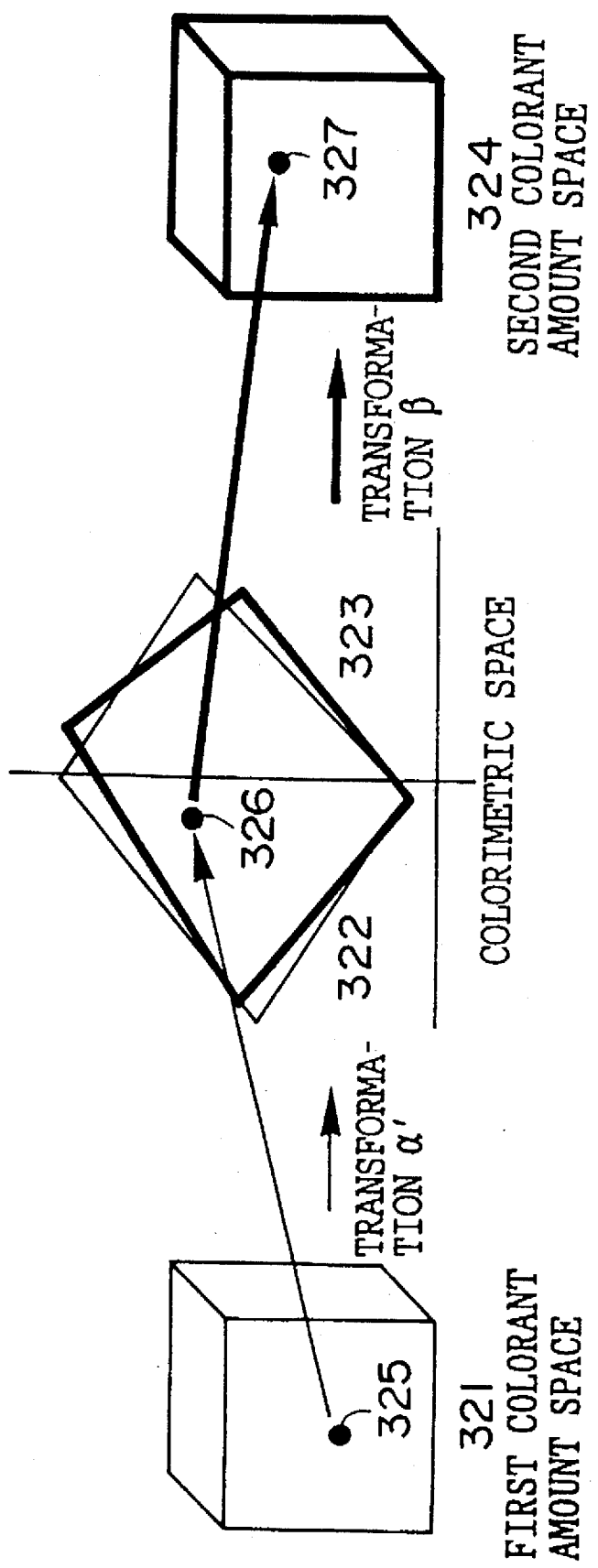

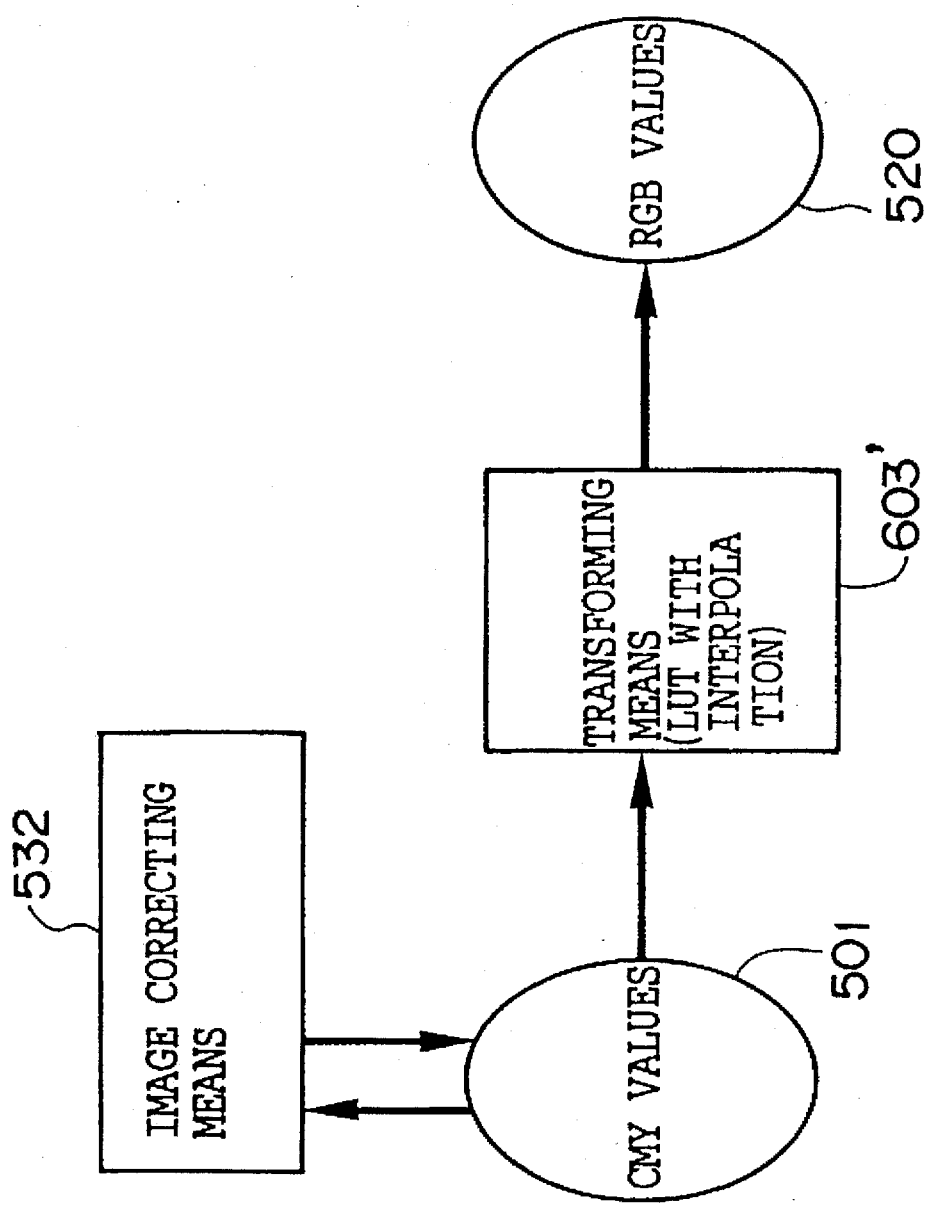

COLORANT-AMOUNT TRANSFORMING METHOD

BACKGROUND OF THE INVENTION

1. Field of the Invention

The present invention relates to a colorant-amount transforming method, and more particularly to a colorant-amount transforming method which is capable of imparting similar colors to images formed by image-forming media, such as paper and a CRT used for simulation, for forming images by printing, displaying or the like even if colorimetric values of the image-forming media differ from each other such as between a color printing machine and a multicolor-image forming apparatus, e.g., a color printer, between multicolor-image forming apparatuses, or between a multicolor-image forming apparatus and a multicolor-image displaying device, e.g., a CRT. In addition, the present invention concerns a colorant-amount transforming method which is used in a color matching system or a color reproducing system which takes into consideration differences in colorimetric values of various printing sheets such as paper, i.e., image-forming media in a multicolor-image forming apparatus, and in a computer-aided color matching system or a color reproducing system for obtaining a color mixture which is isomeric or metameric with a sample color on the basis of a mixing ratio of basic colorants or mixing amounts of basic colorants.

2. Description of the Related Art

In recent years, a multiplicity of kinds of multicolor-image forming apparatuses, such as color printing machines and color printers, have come to be used. There are cases where paper and the like, which are printing sheets used for forming images by various multicolor-image forming apparatuses, exhibit different colorimetric values, and printing sheets exhibiting different colorimetric values are used for identical multicolor-image forming apparatuses. For this reason, there has been a demand that a color matching of reproduced images be established in cases where colorimetric values of the printing sheets used differ from each other such as between a printing machine and a color printer, between various color printers, or in the same multicolor-image forming apparatus.

Generally, in two multicolor-image forming apparatuses A and B (e.g., a proofing printing machine and a sublimation-type printer) respectively using printing sheets a and b whose colors differ, in order to allow the colorimetric values of an image formed on the printing sheet b by the multicolor-image forming apparatus B to be made similar to, i.e., isomerically or metamerically color-match, the colorimetric values of an image formed on the printing sheet a by the multicolor-image forming apparatus A, it is necessary to transform first colorant amounts for forming an image on the printing sheet a into second colorant amounts for forming on the printing sheet b an image exhibiting colorimetric values similar to those of the image formed on the printing sheet a.

Conventionally, the transformation of the colorant amounts is carried out by using two transforming means, as shown in FIGS. 1 and 2. A transforming means 102 effects a transformation α from colorant amounts 101 for the multicolor-image forming apparatus A into colorimetric values of an image formed with the colorant amounts 101 by the multicolor-image forming apparatus A. Meanwhile, a transforming means 104 effects a transformation β from the colorimetric values of the image formed with colorant amounts 105 by the multicolor-image forming apparatus B into the colorant amounts 105 for the multicolor-image forming apparatus B. Thus the colorant amounts subject to transformation are transformed into colorimetric values by the transformation α, and these colorimetric values are then transformed into colorant amounts targeted in the transformation by the transformation β.

By conducting these transformations α and β, the transforming means 102 and the transforming means 104 are coupled to each other via colorimetric values 103 in a colorimetric space (L*a*b*, RGB, etc.) serving as a reference, so that transformation can be effected from the colorant amounts 101 into the colorimetric values 103 by the multicolor-image forming apparatus A, and from the colorimetric values 103 into the colorant amounts 105 by the multicolor-image forming apparatus B. At this time, the image formed with the colorant amounts 101 by the multicolor-image forming apparatus A and the image formed with the colorant amounts 105 by the multicolor-image forming apparatus B are provided with the same colorimetric values 103.

If the colorimetric space serving as a reference, transformations α and β are thus defined, and the means for effecting the transformation between the colorant amounts and colorimetric values of various multicolor-image forming apparatuses are constituted by a computing device or the like for computing by using lookup tables, neural networks, approximation expressions, or the like, it is possible to transform colorant amounts which exhibit similar colorimetric values concerning colors which fall within color-reproducible ranges of two arbitrary multicolor-image forming apparatuses.

It should be noted that, as conventional techniques using neural networks, techniques are disclosed in Japanese Patent Application Laid-Open Nos. 2-241271 and 4-83471. In addition, as a technique using lookup tables, the following technical document, among others, is known: Kodera, "Color Rendition in Digital Printing," The Journal of the Institute of Image Electronics Engineers of Japan: 14, 5, 1985.

However, in a case where the colorimetric values of the printing sheets used are mutually different, e.g., between different multicolor-image forming apparatuses A and B (e.g., a proofing printing machine and a sublimation-type printer) using printing sheets whose colorimetric values differ, the following drawback can be encountered: As shown in FIG. 2, colorimetric values 208 in which all the colorant amounts used in the multicolor-image forming apparatus A correspond to zeros, i.e., the colorimetric values of the printing sheet a itself for the multicolor-image forming apparatus A (i.e., the white color of the image formed by the multicolor-image forming apparatus A since the printing sheets are normally white), may be colorimetric values which cannot be reproduced by the multicolor-image forming apparatus B. Even if the colorimetric values could be reproduced, the colorant amounts of the multicolor-image forming apparatus B exhibiting the same colorimetric values may not necessarily be zeros. That is, as shown in FIG. 2, the colorimetric values 208 in which all the colorant amounts used in the multicolor-image forming apparatus A correspond to zeros differ from colorimetric values 209 of the printing sheet itself used in the multicolor-image forming apparatus B.

It should be noted that, in FIG. 2, reference numeral 201 denotes a colorant amount space of the multicolor-image forming apparatus A; 205, an arbitrary colorant amount in the colorant amount space 201; 202, a colorimetric space obtained by the transformation α; 204, a colorant amount space of the multicolor-image forming apparatus B; 203, a colorimetric space corresponding to the colorant amount space 204 obtained by the transformation β; 208, a colorimetric value corresponding to the colorant amount 205; and 207, a colorant amount of the multicolor-image forming apparatus B corresponding to the colorimetric value 206.

In addition, the image whose colorant amounts are not zeros in the multicolor-image forming apparatus B has a different color from that of the printing sheet b itself of the multicolor-image forming apparatus B. Yet, since a human visual perception regards the color of the printing sheet b itself as being white, there arises the problem that the image in which a white color is reproduced by the multicolor-image forming apparatus A does not appear to be white in the multicolor-image forming apparatus B.

Incidentally, as a technique for effecting a color matching simulation, a technique is known in which the white level of a display image is matched to the color of the ground of printed matter by adjusting the white balance by varying the highlight-side gradations of a color image by greater degrees than on the shadow side (Japanese Patent Application Laid-Open No. 2-217854).

SUMMARY OF THE INVENTION

The present invention has been devised to overcome the above-described problems, and it is an object of the present invention to provide a colorant-amount transforming method wherein, in both cases where a white color in the multicolor-image forming apparatus A has colorimetric values which cannot be reproduced by the multicolor-image forming apparatus B, and cases where, even if they can be reproduced, colorant amounts in the multicolor-image forming apparatus B exhibiting the same colorimetric values are not zeros, the white color in the multicolor-image forming apparatus A can be made to correspond to the white color in the multicolor-image forming apparatus B, so that similar colors can be imparted to images formed by the multicolor-image forming apparatuses A and B.

Another object of the present invention is to provide a colorant-amount transforming method wherein, even if a medium is changed for the multicolor-image forming apparatus B, similar colors can be imparted to images formed by the multicolor-image forming apparatuses A and B.

Still another object of the present invention is to provide a colorant-amount transforming method which is capable of simulating a color of an image formed on a medium having colorimetric values different from those of the white color of newspaper or the like.

To attain the above objects, in accordance with a first aspect of the present invention, there is provided a colorant-amount transforming method for transforming a first colorant amount for forming an image on a first medium into a second colorant amount for forming the image on a second medium whose colorimetric value differs from that of the first medium, comprising the steps of: (a) transforming the colorant amount subject to transformation into a colorimetric value by a first transformation for transforming the first colorant value into a colorimetric value corresponding to one of a tristimulus value and a spectral reflectance in which a portion of contribution of one of the tristimulus value and the spectral reflectance of the first medium itself to one of the tristimulus value and the spectral reflectance of the image formed on the first medium with the first colorant amount is replaced by one of the tristimulus value and the spectral reflectance of the second medium itself in accordance with a contribution rate; and (b) transforming the colorimetric value obtained by the transformation in step (a) into a colorant amount targeted in the transformation by a second transformation in which the colorimetric value of the image formed on the second medium with the second colorant amount is transformed into the second colorant amount.

In accordance with a second aspect of the present invention, there is provided a colorant-amount transforming method for transforming a first colorant amount for forming an image on a first medium into a second colorant amount for forming the image on a second medium whose colorimetric value differs from that of the first medium, comprising the steps of: (a) transforming the colorant amount subject to transformation into a colorimetric value by a first transformation for transforming the first colorant amount into a colorimetric value of the image formed on the first medium with the first colorant amount; and (b) transforming the colorimetric value obtained by the transformation in step (a) into a colorant amount targeted in the transformation by a second transformation for transforming into the second colorant amount a colorimetric value corresponding to one of a tristimulus value and a spectral reflectance in which a portion of contribution of one of the tristimulus value and the spectral reflectance of the second medium itself to one of the tristimulus value and the spectral reflectance of the image formed on the second medium with the second colorant amount is replaced by one of the tristimulus value and the spectral reflectance of the first medium itself in accordance with a contribution rate.

As the colorant amounts in the present invention, i.e., colorant values, it is possible to use the amounts of R (red), G (green), and B (blue) which are the three primaries in the additive mixture for forming a multicolor image, the amounts of C (cyan), M (magenta), and Y (yellow) which are the three primaries in the subtractive mixture for forming a color image, or the amounts of C, M, Y, and K (black).

In addition, in the present invention, the colorant amount not only refers to the amount of a colorant, e.g., a mixing amount, but also a colorant value in the case of RGB or the like, e.g., a ratio among R, G, and B. Further, printing includes copying as well.

In addition, as the colorimetric values, it is possible to use values in a colorimetric space such as the Munsell renotation system (OSA 1943), L*a*b*, L*u*v* (CIE 1976, JIS Z 8729, XYZ (CIE 1964, JIS Z 8701), $X_{10}Y_{10}Z_{10}$ (CIE 1964, JIS Z 8701), HVC, YIQ, YUV, Yxy, and the like.

A rate of contribution K, which is a rate of contribution Ka of one of the tristimulus value and the spectral reflectance of the first medium itself to one of the tristimulus value and the spectral reflectance of the image formed on the first medium with the first colorant amount, or a rate of contribution Kb of one of the tristimulus value and the spectral reflectance of the second medium itself to one of the tristimulus value and the spectral reflectance of the image formed on the second medium with the second colorant amount, can be determined for each required combination of the colorant amounts by measuring respective tristimulus values RA(i) and RB(i) or spectral reflectances RA(λ) and RB(λ) of the images formed with the same colorant amounts on two kinds of media a and b exhibiting different tristimulus values Wa (i) and Wb(i) or spectral reflectances Wa(λ) and Wb(λ) by using a multicolor-image forming apparatus or multicolor-image forming apparatuses, and by using the following formula expressing a contribution rate concerning one colorant amount:

(a) In a case where tristimulus values are used $$K(i)=(RA(i)-RB(i))/(Wa(i)-Wb(i)) \quad (1)$$

where i=1, 2, or 3, and in a case where XYZ is used for the tristimulus color space, correspondences are provided such that RA(1)=X, RA(2)=Y, and RA(3)=Z.

(b) In a case where spectral reflectances are used $$K(\lambda)=(RA(\lambda)-RB(\lambda))/(Wa(\lambda)-Wb(\lambda)) \quad (2)$$

where $\lambda$ denotes a wavelength.

In a case where an image is formed by the multicolor-image forming apparatus by an area gradation method, the aforementioned contribution rate is substantially equal to a ratio of an area of the portion of the medium not covered with the colorant (a ratio of an area of the portion of the medium not covered with the colorant to an overall area of the medium), so that this area ratio may be set as the contribution rate. In the case of a halftone dot method among area gradation methods, if a first colorant for forming an image on the first medium is of n kinds, and each of the colorant amounts ranges in steps of from a1 to an %, the area ratio is expressed as follows:

$$(1-a1/100)\times(1-a2/100) \times \ldots \times (1-an/100) \quad (3)$$

Hence, this area ratio may be set as the contribution rate.

In addition, in a case where a second colorant for forming an image on the second medium is of m kinds, and each of the colorant amounts ranges in steps of from b1 to bm %, the contribution rate is expressed as follows:

$$(1-b1/100)\times(1-b2/100) \times \ldots \times (1-bm/100) \quad (4)$$

Incidentally, in a case where, for instance, R, G, and B are used as the colorant amounts, it suffices if R, G, and B are respectively set in % values, and a setting is provided such that $a_1$=100–R, $a_2$=100–G, and $a_3$=100–B, or $b_1$=100–R, $b_2$=100–G, and $b_3$=100–B.

On the other hand, in a case where the multicolor-image forming apparatus generates gradations by the halftone dot method by using three colorants C, M, and Y, the contribution rate may be determined by the above-described technique with respect to seven sets with C, M, Y, CM, CY, MY, and CMY set as 100%. Further, in a case where tristimulus values are used, the contribution rates may be respectively set as Kc(i), Km(i), Ky(i), Kcm(i), Kcy(i), Kmy(i), and Kcmy(i), and the contribution rate K(c, m, y, i) when C, M, and Y are c %, m %, and y %, respectively, may be determined as follows:

$K(c, m, y, i) =$ (5)

| | | | |
|---|---|---|---|
| (1 – c/100) | × (1 – m/100) | × (1 – y/100) | + |
| c/100 | × (1 – m/100) | × (1 – y/100) | × Kc(i) + |
| (1 – c/100) | × m/100 | × (1 – y/100) | × Km(i) + |
| (1 – c/100) | × (1 – m/100) | × y/100 | × Ky(i) + |
| c/100 | × m/100 | × (1 – y/100) | × Kcm(i) + |
| c/100 | × (1 – m/100) | × y/100 | × Kcy(i) + |
| (1 – c/100) | × m/100 | × y/100 | × Kmy(i) + |
| c/100 | × m/100 | × y/100 | × Kcmy(i) + |

In a case where spectral reflectances are used, the aforementioned contribution rates may be respectively set as Kc($\lambda$), Km($\lambda$), Ky($\lambda$), Kcm($\lambda$), Kcy($\lambda$), Kmy($\lambda$), and Kcmy($\lambda$), and the contribution rate K(c, m, y, $\lambda$) when C, M, and Y are c %, m %, and y %, respectively, may be determined as follows:

$K(c, m, y, \lambda) =$ (6)

| | | | |
|---|---|---|---|
| (1 – c/100) | × (1 – m/100) | × (1 – y/100) | + |
| c/100 | × (1 – m/100) | × (1 – y/100) | × Kc($\lambda$) + |
| (1 – c/100) | × m/100 | × (1 – y/100) | × Km($\lambda$) + |
| (1 – c/100) | × (1 – m/100) | × y/100 | × Ky($\lambda$) + |
| c/100 | × m/100 | × (1 – y/100) | × Kcm($\lambda$) + |
| c/100 | × (1 – m/100) | × y/100 | × Kcy($\lambda$) + |
| (1 – c/100) | × m/100 | × y/100 | × Kmy($\lambda$) + |
| c/100 | × m/100 | × y/100 | × Kcmy($\lambda$) |

In the first aspect of the invention, by using the above-described contribution rate, the colorant amount subject to transformation is transformed into a colorimetric value by the first transformation (transformation $\alpha'$) for transforming the first colorant amount into a colorimetric value corresponding to a tristimulus value (or a spectral reflectance) in which a portion of contribution of the tristimulus value (or the spectral reflectance) of the first medium itself to the tristimulus value (or the spectral reflectance) of the image formed on the first medium with the first colorant amount is replaced by the tristimulus value (or the spectral reflectance) of the second medium itself in accordance with a contribution rate. Then, the colorimetric value obtained by the transformation $\alpha'$ is transformed into the second colorant amount by the second transformation (transformation $\beta$) in which the colorimetric value of the image formed on the second medium is transformed into the second colorant amount.

Since the colorimetric value in the above-described transformation $\alpha'$ corresponds to a tristimulus value (or a spectral reflectance) in which a portion of contribution of the tristimulus value (or the spectral reflectance) of the first medium itself to the tristimulus value (or the spectral reflectance) of the image formed on the first medium with the first colorant amount is replaced by the tristimulus value (or the spectral reflectance) of the second medium itself in accordance with a contribution rate, the second colorant amount obtained by the transformation $\beta$ becomes a value in which the tristimulus value (or the spectral reflectance) of the first medium itself is replaced by the tristimulus value (or the spectral reflectance) of the second medium itself.

If the tristimulus value is used, as shown in FIG. 3, a tristimulus value KaWb(i), in which the tristimulus value Wb(i) of the second medium itself is multiplied by the contribution rate Ka, is added to a tristimulus value RA(i) –KaWa(i) in which a tristimulus value KaWa(i) obtained by multiplying the tristimulus value Wa(i) of the first medium itself by the contribution rate Ka is subtracted from the tristimulus value RA(i) of the image formed on the first medium with the first colorant amount, thereby making it possible to obtain the tristimulus value R'a of the following formula in which the portion of contribution of the tristimulus value of the first medium is replaced by the tristimulus value of the second medium in accordance with a contribution rate:

$$R'a(i)=RA(i)+Ka[Wb(i)-Wa(i)] \quad (7)$$

In the conventional transformation $\alpha$, the colorant amount is transformed into a colorimetric value corresponding to the tristimulus value RA(i), whereas, in the first transformation (transformation α') in the first aspect of the invention, the colorant amount is transformed into a colorimetric value corresponding to the tristimulus value R'a.

Consequently, in the conventional transformation α, as shown in FIG. 2, colorimetric values 208 in which all the first colorant amounts correspond to zeros differ from colorimetric values 209 of the second medium itself. In the transformation α' in accordance with the first aspect of the invention, however, in the case where all the first colorant amounts are zeros, portions of contribution of the tristimulus values of the first medium to the tristimulus values of the image are 100%, and all the tristimulus values of the first medium are replaced by the tristimulus values of the second medium. Therefore, as shown in FIG. 4, colorimetric values 408 in which all the first colorant amounts correspond to zeros become identical to colorimetric values 409 of the second medium itself. Here, the colorimetric values 409 are the same values as the colorimetric values 209 shown in FIG. 2.

In addition, in the case of the first colorant amounts exhibiting colorimetric values in which the contribution rates of the tristimulus values are small (i.e., colorimetric values which are relatively remote from the colorimetric values 408), since the amounts of replacement of the tristimulus values are small, these first colorant amounts are transformed into colorant amounts which are close to those in the case of the conventional transformation α. Additionally, the first colorant amounts exhibiting colorimetric values in which the contribution rates are 0 are transformed into the second colorant amounts exhibiting identical colorimetric values.

Incidentally, in FIG. 4, reference numeral 402 denotes a colorimetric space obtained by the transformation α' in accordance with the present invention; 404, a colorant amount space of the second colorant amounts; 403, a colorimetric space corresponding to the colorant amount space 404 obtained by the second transformation (transformation β); 406, a colorimetric value corresponding to the colorant amount 205; and 407, a second colorant amount corresponding to the colorimetric value 406.

Although a description has been given of the tristimulus values in the above, the case of spectral reflectances is also similar, in which case FIG. 3 can be translated into FIG. 7, and Formula (7) is rewritten as follows:

$$R'a(\lambda) = RA(\lambda) + Ka[Wb(\lambda) - Wa(\lambda)] \quad (8)$$

In the second aspect of the invention, in step (a), the first colorant amount is transformed into a colorimetric value by a first transformation (transformation α) for transforming the first colorant amount into a colorimetric value of the image formed on the first medium. Then, in step (b), the colorimetric value obtained by the transformation α is transformed into the second colorant amount by the second transformation (transformation β') for transforming into the second colorant amount a colorimetric value corresponding to a tristimulus value (or a spectral reflectance) in which a portion of contribution of the tristimulus value (or the spectral reflectance) of the second medium itself to the tristimulus value (or the spectral reflectance) of the image formed on the second medium with the second colorant amount is replaced by the tristimulus value (or the spectral reflectance) of the first medium itself in accordance with a contribution rate.

The colorimetric value transformed into the second colorant amount by the transformation β' corresponds to a tristimulus value (or a spectral reflectance) in which a portion of contribution of the tristimulus value (or the spectral reflectance) of the second medium itself to the tristimulus value (or the spectral reflectance) of the image formed on the second medium is replaced by the tristimulus value (or the spectral reflectance) of the first medium itself in accordance with a contribution rate. Therefore, the second colorant amount obtained by the transformation β' becomes a colorant amount which corresponds to a value in which the tristimulus value (or the spectral reflectance) of the second medium itself is replaced by the tristimulus value (or the spectral reflectance) of the first medium itself.

In the case of the tristimulus value, as shown in FIG. 5, a tristimulus value KbWa(i), in which the tristimulus value Wa(i) of the first medium itself is multiplied by the contribution rate Kb, is added to a tristimulus value RB(i) −KbWb(i) in which a tristimulus value KbWb(i) obtained by multiplying the tristimulus value Wb(i) of the second medium b itself by the contribution rate Kb is subtracted from the tristimulus value RB(i) of the image formed on the second medium b with the second colorant amount, thereby making it possible to obtain the tristimulus value R'b of the following formula in which the contributing portion of the second medium is replaced by the contributing portion of the first medium:

$$R'b(i) = RB(i) + Kb[Wa(i) - Wb(i)] \quad (9)$$

Consequently, in the transformation β' in accordance with the present invention, in the case where all the second colorant amounts are zeros, portions of contribution of the tristimulus values of the second medium b to the tristimulus values of the image are 100%, and all the tristimulus values of the second medium b itself are replaced by the tristimulus values of the first medium a. Therefore, as shown in FIG. 6, colorimetric values 609 in which all the second colorant amounts correspond to zeros become identical to colorimetric values 608 of the first medium a itself. Here, the colorimetric values 608 are the same values as the colorimetric values 208.

Incidentally, in FIG. 8, reference numeral 604 denotes a colorant amount space of the second colorant amounts; 603, a colorimetric space corresponding to the colorant amount space 604 obtained by the transformation β'; 606, a colorimetric value corresponding to the colorant amount 205; and 607, a second colorant amount corresponding to the colorimetric value 606.

In addition, in the case of the first colorant amounts exhibiting colorimetric values in which the contribution rates of the tristimulus values are small, since the amounts of replacement of the tristimulus values are small, these first colorant amounts are transformed into the second colorant amounts which are close to those in the case of the transformation β. Additionally, the first colorant amounts exhibiting colorimetric values in which the contribution rates are 0 are transformed into the second colorant amounts exhibiting identical colorimetric values.

Although a description has been given of the tristimulus values in the above, the case of spectral reflectances is also similar, in which case FIG. 7 can be translated into FIG. 8, and Formula (9) is rewritten as follows:

$$R'b(\lambda) = RB(\lambda) + Kb[Wa(\lambda) - Wb(\lambda)] \quad (10)$$

As described above, in the present invention, as for the first colorant amounts exhibiting colorimetric values on which the effect of the difference in the colorimetric values of the media themselves is small, these first colorant amounts are transformed into the second colorant amounts exhibiting identical colorimetric values as practically as possible. Meanwhile, the first colorant amounts exhibiting colorimetric values on which the effect of the difference in the colorimetric values of the media is large are transformed into the second colorant amounts exhibiting colorimetric values close to those of the second medium. The changeover is effected in a continuous fashion and in such a manner as to appear natural in a visual perception. Therefore, the white color in one multicolor-image forming apparatus can be made to correspond to the white color in another multicolor-image forming apparatus, and images formed by various multicolor-image forming apparatuses can be made similar in color.

Incidentally, in a case where media of different colorimetric values are used by the same multicolor-image forming apparatus, the white color of one medium can be made to correspond to the white color of another medium, and images formed on the media can be made similar in color.

In the second aspect of the invention, in a case where a second medium is changed to a third medium, it suffices if a colorimetric value, corresponding to a tristimulus value (or a spectral reflectance) in which a portion of contribution of the tristimulus value (or the spectral reflectance) of the second medium itself to the tristimulus value (or the spectral reflectance) of the image formed on the second medium with the second colorant amount is replaced by the tristimulus value (or the spectral reflectance) of the third medium itself in accordance with a contribution rate, is transformed into the second colorant amount.

FIG. 9 shows the relationship between the colorant amount space and the colorimetric space in this case.

In FIG. 9, numerals 311 is the first colorant amount space, 312 is an area of the colorimetric space to which the first colorant amount space is transformed by transformation α, 313 is an area of the colorimetric space transformed to the second colorant amount space by transformation β', 314 is the second colorant amount space, 315 is an colorant amount in the first colorant space, 316 is the colorimetric value corresponding to the colorant amount 315, and 317 is the colorant amount in the second colorant amount space corresponding to the colorimetric value 316.

Furthermore, in the first transformation in accordance with the first aspect of the invention, the colorant amount subject to transformation can be transformed into a colorimetric value corresponding to a tristimulus value (or a spectral reflectance) in which a portion of contribution of the tristimulus value (or the spectral reflectance) of the first medium itself to the tristimulus value (or the spectral reflectance) of the image formed on the first medium with the first colorant amount is replaced by the tristimulus value (or the spectral reflectance) of the third medium itself in accordance with a contribution rate. By transforming this colorimetric value into the colorant amount for the image forming apparatus, it is possible to simulate an image formed on the third medium.

FIG. 10 shows the relationship between the colorant amount space and the colorimetric space in this case.

In FIG. 10, numerals 321 is the first colorant amount space, 322 is an area of the colorimetric space to which the first colorant amount space is transformed by transformation α', 323 is an area of the colorimetric space transformed to the second colorant amount space by transformation β, 324 is the second colorant amount space, 325 an colorant amount in the first colorant space, 326 is the colorimetric value corresponding to the colorant amount 325, and 327 is the colorant amount in the second colorant amount space corresponding to the colorimetric value 326.

Although, in the above description, a description has been given of the case of two different multicolor-image forming apparatuses, the present invention is similarly applicable to cases where different media are handled by a single multicolor-image forming apparatus or identical multicolor-image forming apparatuses.

In addition, as shown in FIG. 11, it is possible to allow a single transforming means γ to effect the same operation as that of the above-described transformation as a consequence. That is, a single transforming means may be used to transform the first colorant amount into the second colorant amount by adopting a single lookup table containing, or causing a single neural network to learn, the results of the following transformation in the colorant-amount transforming method in the present invention: first colorant amounts (e.g., cmy % values)—colorimetric values (e.g., $L^*a^*b^*$ values)—second colorant amounts (e.g., cmy % values).

The above and other objects, features and advantages of the present invention will become more apparent from the following detailed description of the invention when read in conjunction with the accompanying drawings.

BRIEF DESCRIPTION OF THE DRAWINGS

FIG. 2 is a conceptual diagram explaining a conventional colorant-amount transforming method;

FIG. 4 is a conceptual diagram explaining a colorant-amount transforming method in accordance with the present invention for transforming colorant amounts by using the above-described first method;

FIG. 7 is a diagram explaining a first method for correcting spectral reflectances;

FIG. 8 is a diagram explaining a second method for correcting spectral reflectances;

FIG. 9 is a conceptual diagram explaining the colorant-amount transforming method in accordance with the present invention for transforming colorant amounts by using the first method for correcting spectral reflectances;

FIG. 10 is a conceptual diagram explaining the colorant-amount transforming method in accordance with the present invention for transforming colorant amounts by using the second method for correcting spectral reflectances;

FIG. 20 is a block diagram in a case where the transforming means in FIG. 19 are formed as a single transforming means.

DESCRIPTION OF THE PREFERRED EMBODIMENTS

Referring now to the accompanying drawings, a detailed description will be given of the embodiments of the present invention. In the following embodiments, a proofing printing machine was used as a multicolor-image forming apparatus A, and the sublimation-type printer S6600-30 (manufactured by Mitsubishi Electric Corporation; tradename) was used as a multicolor-image forming apparatus B.

Figure 12:
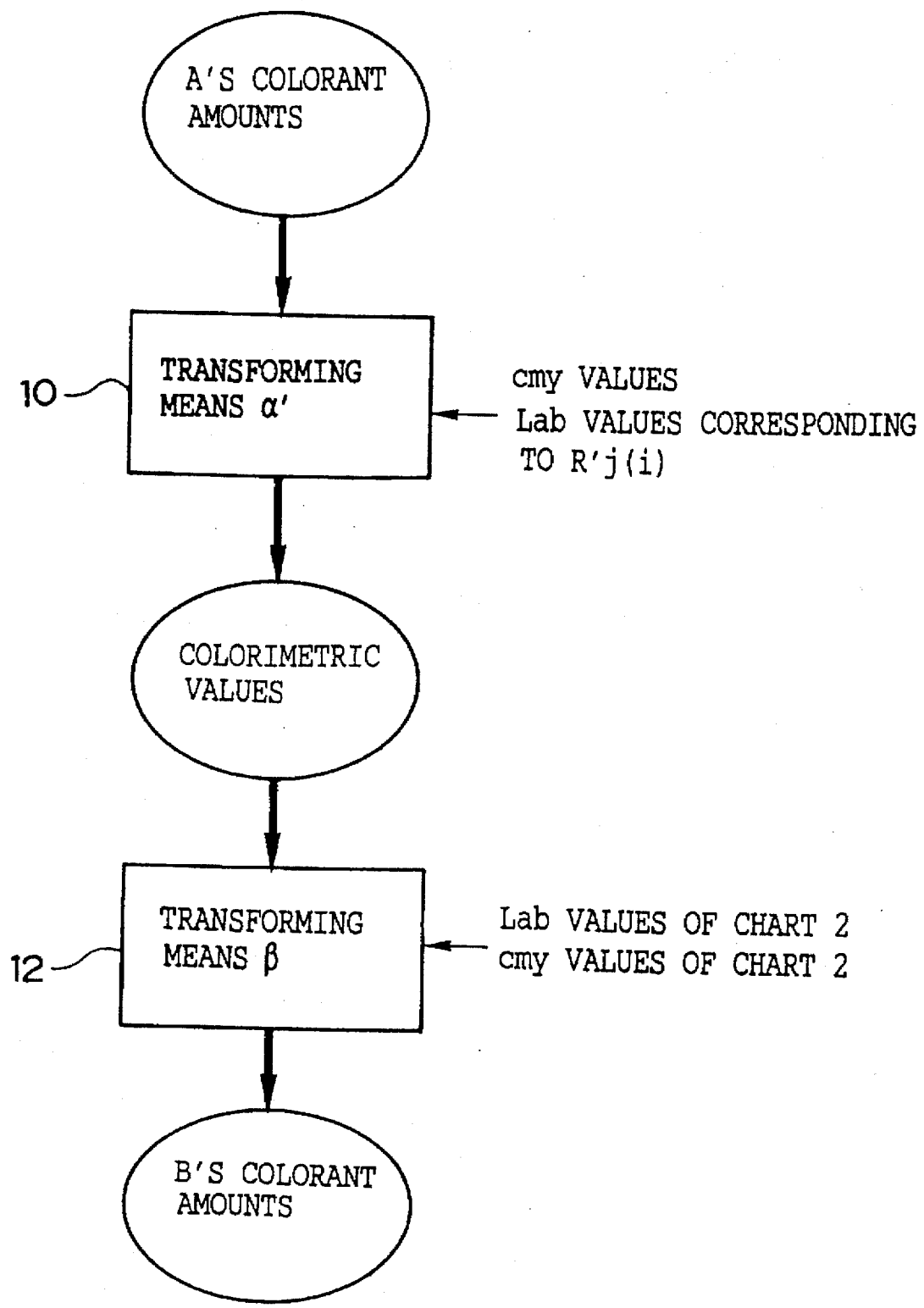
FIG. 12 is a block diagram in accordance with the first embodiment in which tristimulus values are used.

As shown in FIG. 12, the colorant-amount transforming apparatus in accordance with a first embodiment was provided with a first transforming means 10 for effecting a transformation $\alpha'$ and a second transforming means 12 for effecting a transformation $\beta$. The first transforming means 10 and the second transforming means 12 were each constituted by a neural network which was comprised of an input layer, an intermediate layer, and an output layer. The neural network was learned in the following manner.

First, a chart image having 216 combinations of colorants of cyan (C), magenta (M), and yellow (Y), in which the amount of each of these colorants was varied in steps of 20% (0, 20, 40, 60, 80, and 100%), was prepared. By using the spectrocolorimeter X-Rite 938 (manufactured by X-Rite Inc.; tradename), tristimulus values (XYZ values) of a chart image 1 outputted by the proofing printing machine and tristimulus values Wa(i) of a printing sheet a itself used in the proofing printing machine were measured, and tristimulus values of a chart image 2 outputted by the sublimation-type printer and tristimulus values Wb(i) of a printing sheet b itself used in the sublimation-type printer were measured.

Figure 13:
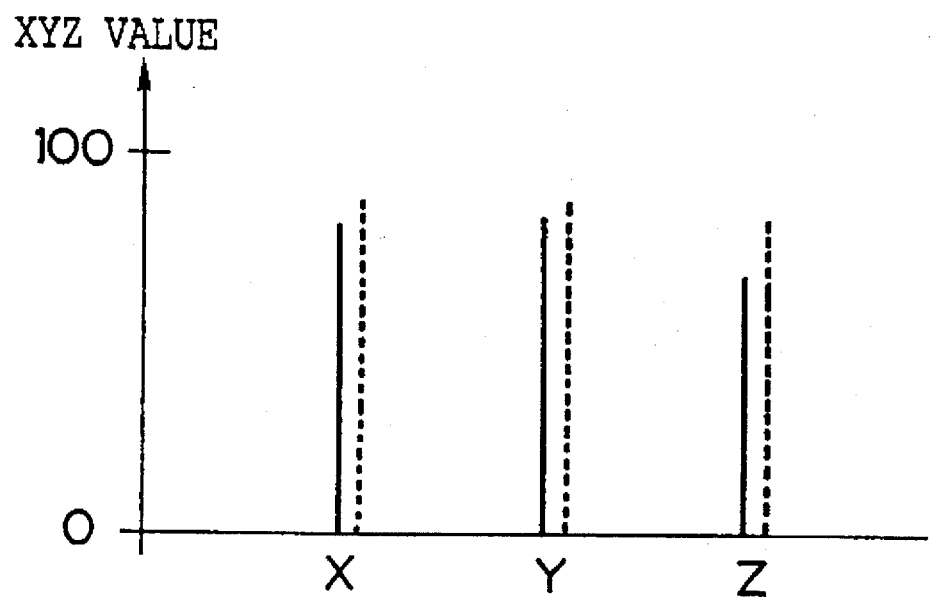
FIG. 13 is a diagram illustrating the results of measurement of tristimulus values in accordance with the first embodiment.

FIG. 13 shows the results of measurement of the tristimulus values Wa(i) and Wb(i) of the printing sheets themselves used in the proofing printing machine and the sublimation-type printer, respectively.

If L*a*b* values (hereafter referred to as Lab values) of the printing sheets themselves with a 2-degree field of view and under a CIE D50 illuminant were determined, the following Lab values were obtained:

| Printing sheet for the proofing printing machine A: | | |
|---|---|---|
| 92.9 | 0.17 | 2.04 |
| Printing sheet for the sublimation-type printer B: | | |
| 95.3 | 1.23 | −7.00 |

As the Lab values suggest, the printing sheet for the proofing printing machine looked relatively yellowish in comparison with the printing sheet for the sublimation-type printer. To the contrary, the printing sheet for the sublimation-type printer looked relatively bluish in comparison with the printing sheet for the proofing printing machine.

The tristimulus values $R_j(i)$ of the chart image 1 with colorant amounts $c_j$, $m_j$, and $y_j$ % outputted by the proofing printing machine A were transformed into tristimulus values $R'_j(i)$ in accordance with the following formula in which j=1, 2 ..., 216, and corresponded to 0, 20, 40, 60, 80, and 100% mentioned above.

$$R'_j(i)=R_j(i)+K_j(i)\times(-Wa(i)+Wb(i)) \tag{11}$$

where, $K_j(i)=(1-c_j/100)\times(1-m_j/100)\times(1-y_j/100)$

Wa(i)=tristimulus value of the printing sheet for the proofing printing machine

Wb(i)=tristimulus value of the printing sheet for the sublimation-type printer

Here, i=1, 2, and 3, and since X, Y and Z were used for the tristimulus color space in this embodiment, $R_j(1)=X$, $R_j(2)=Y$, and $R_j(3)=Z$.

Then, these tristimulus values XYZ were transformed into Lab values by a generally known method.

Coupling factors, i.e., weights, for the respective units of the neural network were determined through learning such that when cmy values were inputted to the input layer of the neural network constituting the first transforming means 10, Lab values determined from the tristimulus values $R'_j(i)$ would be outputted from the output layer. As a result, it was possible to effect the transformation $\alpha'$ for transforming colorant amounts into colorimetric values corresponding to tristimulus values in which portions of contribution of the tristimulus values Wa(i) of the printing sheet a to the tristimulus values of the chart image 1 were transformed into the tristimulus values Wb(i) of the printing sheet b in correspondence with a contribution rate $K_j(i)$.

In addition, weights for the neural network were determined through learning such that Lab values determined from the tristimulus values of the chart image 2 outputted by the sublimation-type printer would be inputted to the input layer of the neural network constituting the second transforming means 12, and cmy values of the chart image 2 outputted by the sublimation-type printer were outputted from the output layer. As a result, it was possible to effect the transformation $\beta$ for transforming colorimetric values of the image formed by the sublimation-type printer into colorant amounts for forming this image.

By adopting the above-described configuration, if the colorant amounts subject to transformation are inputted to the first transforming means 10, the colorant amounts are transformed into colorimetric values by the first transforming means 10, and the colorimetric values are then transformed into targeted colorant amounts by the second transforming means 12.

The results of performing the above-described colorant-amount transformation are shown below in comparison with the results of performing the colorant-amount transformation from the proofing printing machine A to the sublimation-type printer B by allowing conventional neural networks, which are different from the transforming means 10 and 12, to undergo learning.

| A's cmy %: | 0 | 0 | 0 |
| --- | --- | --- | --- |
| Lab value: | 92.9 | 0.17 | 2.04 |
| B's cmy %: | 4 | 0 | 4 |
| Lab value: | 94.6 | 1.10 | −6.83 |

The reason for the fact that cmy % for the sublimation-type printer B was not all 0 was due to calculation errors. However, as can be understood if its Lab values are compared with the Lab values (95.3, 1.23, −7.00) of the printing sheet for the sublimation-type printer B, the color in the case of the sublimation-type printer B was practically indistinguishable from the color of the printing sheet.

For the sake of comparison, the results obtained by the conventional method are shown below.

| A's cmy %: | 0 | 0 | 0 |
| --- | --- | --- | --- |
| Lab value: | 92.9 | 0.17 | 2.04 |
| B's cmy %: | 6 | 5 | 16 |
| Lab value: | 94.2 | −2.22 | 3.23 |

As can be seen from these results, cmy % for the sublimation-type printer B exhibited large values, so that portions which appeared to be white in the image obtained by the proofing printing machine A did not appear to be white in the image obtained by the sublimation-type printer B.

Although, in the above-described embodiment, a description has been given of a case in which the transforming means were constituted by neural networks, the transforming means may be constituted by lookup tables with interpolations.

Next, a description will be given of a second embodiment of the present invention. In this embodiment, spectral reflectances were used instead of the tristimulus values in the first embodiment, and detailed description thereof will be omitted.

Figure 14:
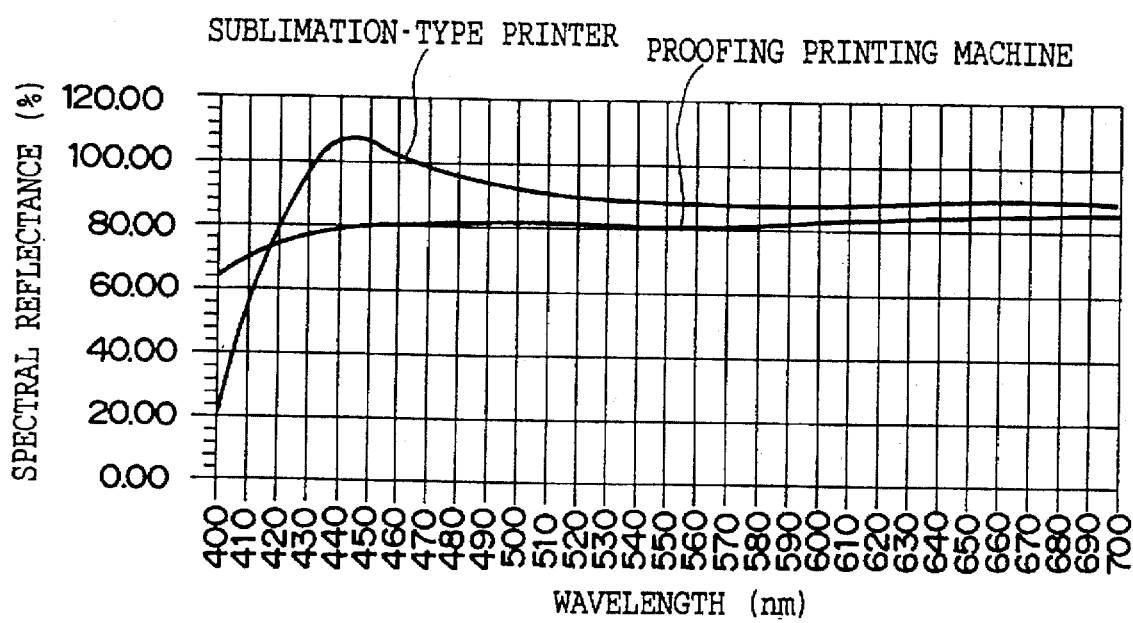
FIG. 14 is a diagram illustrating the results of measurement of spectral reflectances in accordance with a second embodiment.

FIG. 14 shows the results of measurement of spectral reflectances of the printing sheets themselves used in the proofing printing machine and the sublimation-type printer, respectively.

When the Lab values under the conditions of a 2-degree field of view and under a D50 illuminant were determined, results which were similar to those of the first embodiment were obtained. A formula corresponding to Formula (11) in the first embodiment can be expressed as shown in the following Formula (12):

$$R'_j(\lambda) = R(\lambda) + K_j(\lambda) \times (-Wa(\lambda) + Wb(\lambda)) \quad K_j(\lambda) = (1 - c_j/100) \times (1 - m_j/100) \times (1 - y_j/100) \quad (12)$$

$Wa(\lambda)$: spectral reflectance of the printing sheet for the proofing printing machine $Wb(\lambda)$: spectral reflectance of the printing sheet for the sublimation-type printer The transformation (transformation α') from cmy values into Lab values determined from the spectral reflectances R'(λ) was effected by the first transforming means which underwent learning in the same way as in the first embodiment. At the same time, the transformation (transformation β) from Lab values determined from the spectral reflectances of the chart image 2 outputted by the sublimation-type printer B into the cmy values of the sublimation-type printer B was effected by the second transforming means which underwent learning in the same way as in the first embodiment. The results of these colorant-amount transformations are shown below.

| A's cmy %: | 0 | 0 | 0 |
| --- | --- | --- | --- |
| Lab value: | 92.9 | 0.17 | 2.04 |
| B's cmy %: | 3 | 0 | 5 |
| Lab value: | 95.1 | 1.14 | −6.72 |

The reason for the fact that cmy % for the sublimation-type printer B was not all 0 was due to calculation errors. However, as can be understood if its Lab values are compared with the Lab values (95.3, 1.23, −7.00) of the printing sheet for the sublimation-type printer B, the color in the case of the sublimation-type printer B was practically indistinguishable from the color of the printing sheet.

With respect to the first transforming means in the above-described two embodiments, a description has been given of an example which used tristimulus values (or spectral reflectances) in which portions of contribution of the tristimulus values (or spectral reflectances) of the printing sheet of the proofing printing machine to the tristimulus values (or spectral reflectances) of the image formed by the proofing printing machine were transformed into the tristimulus values (or spectral reflectances) of the printing sheet of the sublimation-type printer in accordance with a contribution rate. However, similar results can be obtained if the second transforming means effects a transformation in which colorimetric values corresponding to tristimulus values (or spectral reflectances) are transformed to the colorant amounts of the proofing printing machine in which portions of contribution of the tristimulus values (or spectral reflectances) of the printing sheet of the sublimation-type printer to the tristimulus values (or spectral reflectances) of the image formed by the sublimation-type printer are replaced by the tristimulus values (or spectral reflectances) of the printing sheet for the proofing printing machine in accordance with a contribution rate.

Next, a description will be given of a third embodiment of the present invention with reference to FIG. 15. In this embodiment, the present invention is applied to a case in which, by using CMY values as the colorant amounts and Lab values as the colorimetric values, CMY values 501 for the proofing printing machine were transformed into CMY values 505 for outputting an image onto a plurality of kinds of paper by a color printer capable of printing on plain paper (hereafter referred to as the plain paper color printer).

In addition, although transforming means 502 for effecting the transformation α and transforming means 504 for effecting the transformation β were respectively constituted by neural networks, these transforming means may be constituted by lookup tables (LUTs) with interpolations.

First, a chart image having 216 combinations of colorants of C, M, and Y, in which the amount of each of these colorants was varied in steps of 20%, was prepared in the same way as described above. By using this chart image, the following chart images were obtained: a chart image 1 printed by the proofing printing machine, a chart image 2 printed on normally-used paper (hereafter referred to as the standard paper) by the plain paper color printer, and a chart image 3 printed on paper (reference paper) whose tristimulus values varied substantially from those of the standard paper by means of the plain paper color printer.

The tristimulus values of the chart image 1 were measured, and Lab values 503 were determined from the measured tristimulus values. The neural network constituting the transforming means 502 was made to undergo learning such that when CMY values subject to transformation were inputted, the Lab values of the chart image 1 would be outputted. Consequently, it was possible to transform the CMY values 501 for the proofing printing machine into Lab values 503 of the image formed by the proofing printing machine by using the CMY values 501.

Next, tristimulus values 511 of the chart image 2 were measured and were stored in a storage means 508. In addition, to determine a contribution rate, tristimulus values 510 of the chart image 3 were measured, and the contribution rate was calculated by a contribution-rate calculating means 512 on the basis of the tristimulus values 510 of the chart image 3 and the tristimulus values 511 of the chart image 2, and was stored in the storage means 508. The calculation of the contribution rate was carried out for each combination of the CMY values in accordance with Formula (3), but Formula (5) or another method may be used.

Figure 15:
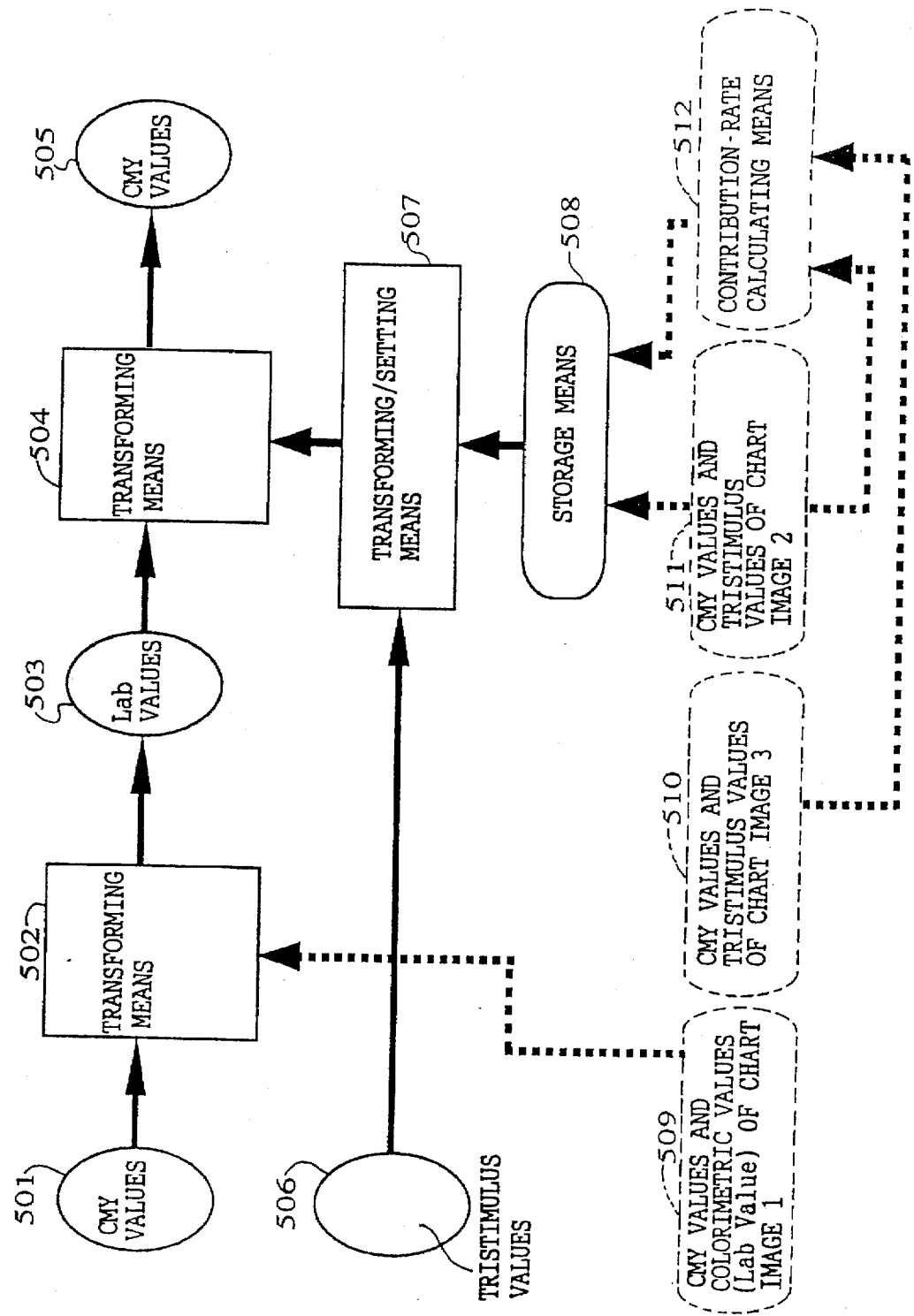
FIG. 15 is a block diagram in accordance with a third embodiment in which tristimulus values are used.

The foregoing constitutes preliminary steps and is indicated by dotted lines in FIG. 15. Thereafter, by using the tristimulus values of arbitrary paper (hereafter referred to as the object paper) itself and the colorant-material transforming system indicated by the solid lines, it was possible to transform the CMY values for the proofing printing machine into CMY values for printing on the object paper by means of the plain paper color printer, as described below.

Tristimulus values 506 of the object paper were inputted into a transforming/setting means 507. The transforming/setting means 507 calculated weights of the neural network for transforming the Lab values 503 into CMY values 505 necessary for reproduction on the object paper by means of the plain paper color printer, on the basis of the tristimulus values 506 of the object paper, the CMY values of the chart image 2 stored in the storage means 508, and the tristimulus values and the contribution rate of the chart image 2.

That is, the weights of the neural network were set such that colorimetric values, corresponding to tristimulus values in which the portions of contribution of the tristimulus values of the plain paper itself to the tristimulus values of the image formed on the plain paper by the CMY values of the plain paper color printer would be replaced by the tristimulus values of the object paper itself in accordance with the contribution rate, were transformed into the colorant amounts.

Thus, the CMY values 501 for the proofing printing machine were transformed into the CMY values 505 for printing with a similar color on the object paper by means of a printer capable of printing on plain paper, by means of the flow which was comprised of the CMY values 501, the transforming means 502, the Lab values 503, the transforming means 504, and the CMY values 505.

In addition, if the mixing ratio of basic colorants is used as the colorant amount, the present invention is applicable to a computer-aided color adjusting system.

Figure 16:
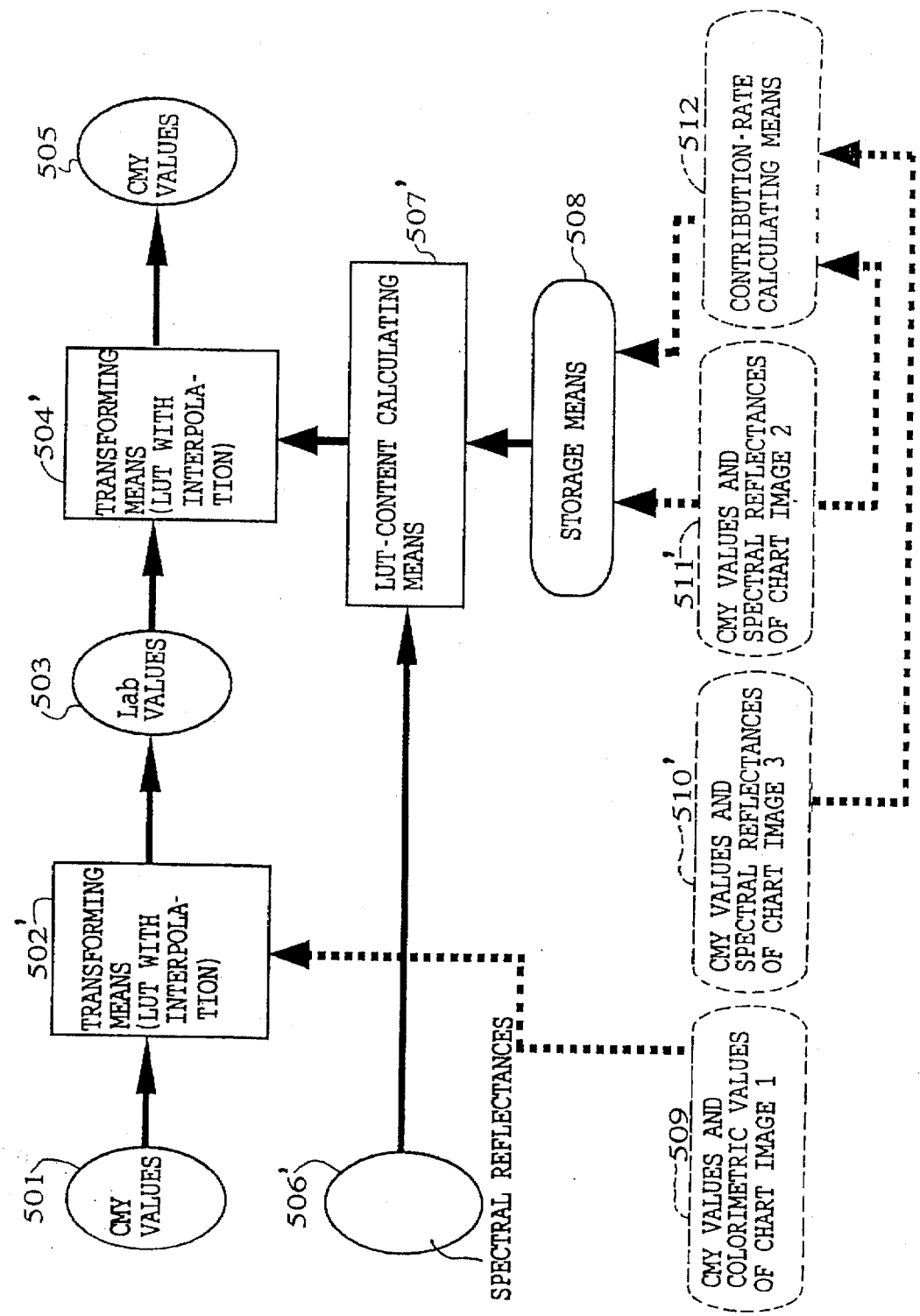
FIG. 16 is a block diagram in a case where the tristimulus values in the third embodiment are changed to spectral reflectances.

Although, in the above-described embodiment, a description has been given of the example in which tristimulus values were used, spectral reflectances may be used instead of the tristimulus values. FIG. 16 shows an example in which the transforming means were respectively constituted by LUTs with interpolations instead of the neural networks, and spectral reflectances were used instead of the tristimulus values. It should be noted that, in FIG. 16, the same portions as those in FIG. 15 are denoted by the same reference numerals, portions that correspond to those in FIG. 15 are denoted by the same reference numerals with dash, and a description thereof will be omitted. In this case as well, the transforming means can be constituted by the neural networks instead of the LUTs with interpolations.

As described above, in accordance with this embodiment, when the relationships between the colorant amounts for the standard paper and colorimetric values of an image formed on the standard paper with those colorant amounts, and the relationships between the colorant amounts for plain paper and the colorimetric values of an image formed on the plain paper with those colorant amounts, as well as the tristimulus values (or spectral reflectances) of the plain paper itself, are already known, the colorant amounts for the standard paper can be transformed into the colorant amounts for the object paper simply by newly measuring the tristimulus values (or spectral reflectances) of the object paper itself in determining the colorant amounts for forming an image having similar colorimetric values on arbitrary object paper by means of a printer used for forming an image on the plain paper.

Next, a description will be given of a fourth embodiment of the present invention. In this embodiment, simulation of an image was carried out.

To carry out accurate simulation in a conventional simulation method, it has been necessary to actually form a chart image on a printing sheet subject to simulation, and measure the colorimetric values thereof in advance. On the other hand, if the colorimetric values of the chart image are not measured, although the color of a white portion can be simulated, it is difficult to accurately simulate the color on the highlight side, so that it has been difficult to conduct simulation with respect to an arbitrary printing sheet.

In the embodiment which is described below, it was made unnecessary to measure the colorimetric values of a chart image on the printing sheet subject to simulation, and transformation into the colorant amounts which allow simulation with respect to an arbitrary printing sheet was carried out merely by measuring the tristimulus values of the printing sheet itself subject to simulation.

Hereafter, a description will be given of this fourth embodiment with reference to FIG. 17. In this embodiment, the present invention is applied to a case in which a simulation image which is transformed to RGB values 520 was displayed on a color monitor so as to simulate a case where an image having CMY values 501 for the proofing printing machine was printed on newspaper by the proofing printing machine by using CMY values and RGB values as the colorant amounts, and Lab values as colorimetric values.

In this embodiment, transforming means 522 and 524 were both constituted by neural networks, but LUTs with interpolations may be used.

First, a chart image similar to the above-described one was prepared. By using this chart image, a chart image 1 printed on the standard paper by the proofing printing machine and a chart image 2 printed on paper whose tristimulus values differed substantially from those of the standard paper were prepared, and a chart image 3 was displayed on a color monitor.

The tristimulus values of the chart image 1 were measured and were stored in a storage means 526. In addition, to determine a contribution rate, the tristimulus values of the chart image 2 were measured, and the contribution rates was calculated by a contribution-rate calculating means 528 on the basis of the tristimulus values of the chart image 1 and the tristimulus values of the chart image 2, and was stored in the storage means 526. Here, the calculation of the contribution rate was carried out for each combination of the CMY values in accordance with Formula (3), but Formula (5) or another method may be used.

The Lab values of the chart image 3 displayed on the color monitor were measured, and the weights of the neural network constituting the transforming means 524 were set through learning such that RGB values for displaying on the color monitor would be outputted when these Lab values were inputted.

Consequently, Lab values 503 could be transformed into RGB values 520 for forming (displaying) an image having these Lab values on the color monitor.

After completion of the foregoing preliminary steps, the tristimulus values 506 of the newspaper were set in a transforming/setting means 530. The transforming/setting means 530 estimated the Lab values at a time of printing the image on the newspaper with CMY values 501 on the basis of these tristimulus values 506 as well as the CMY values, tristimulus values, and contribution rates which were stored in the storage means 526. Further, the transforming/setting means 530 set the weights of the neural network constituting the transforming means 522 through learning such that estimated Lab values would be outputted when these CMY values 501 were inputted.

Figure 1:
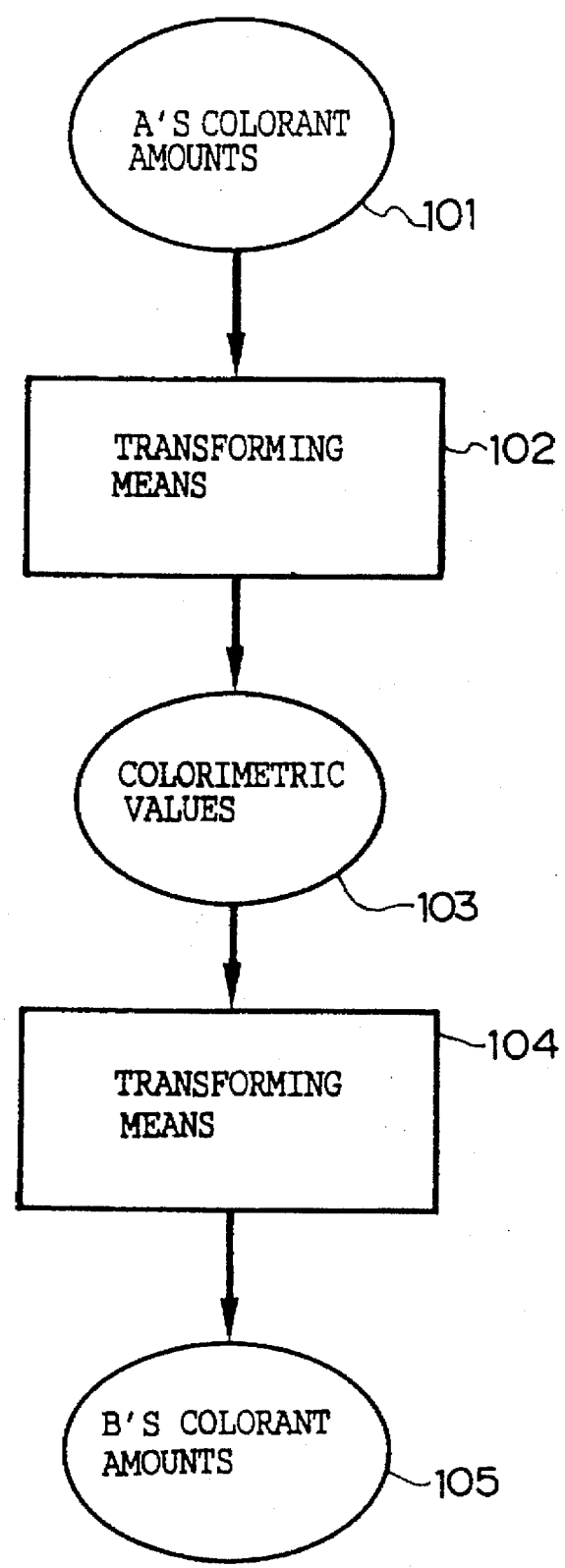
FIG. 1 is a block diagram for transforming colorant amounts.
Figure 3A:
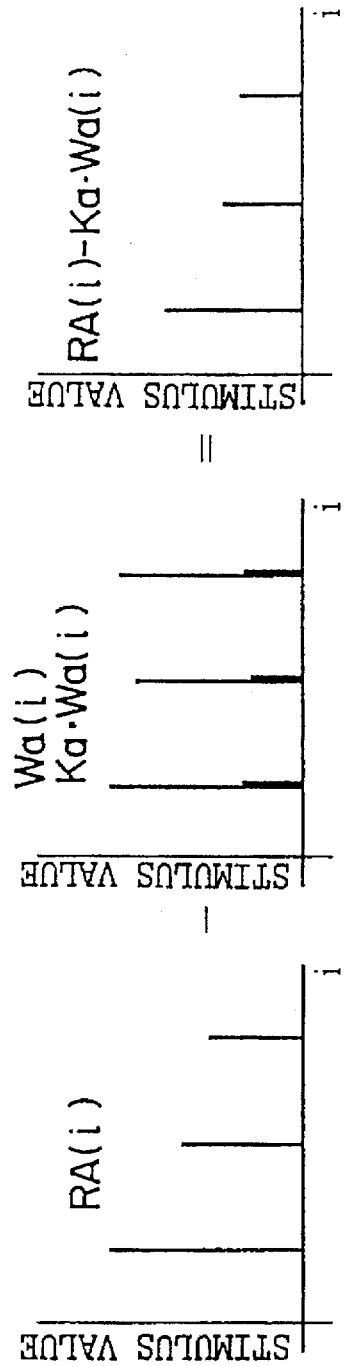
FIG. 3 is a diagram explaining a first method for correcting tristimulus values.
Figure 3B:
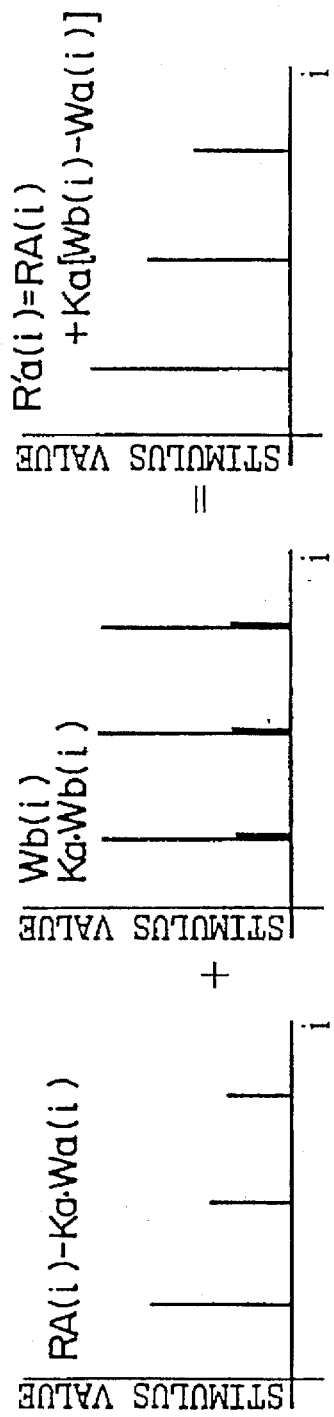
Figure 5A:
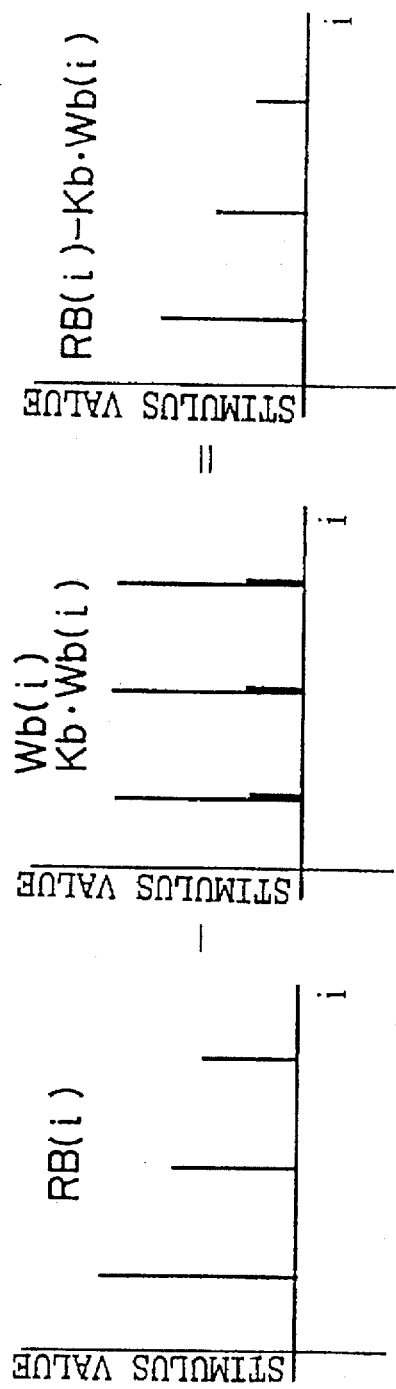
FIG. 5 is a diagram explaining a second method for correcting tristimulus values.
Figure 5B:
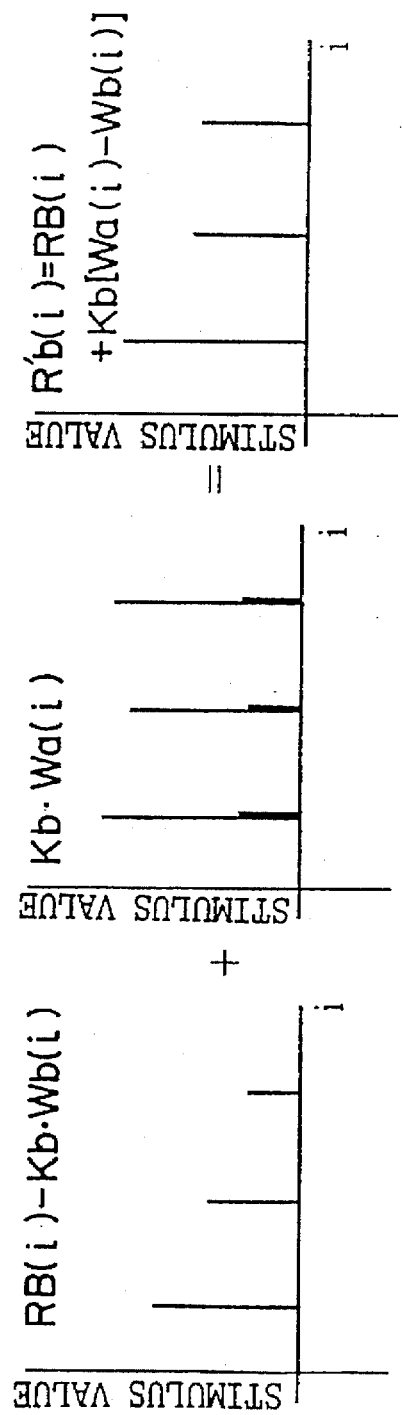
Figure 6:
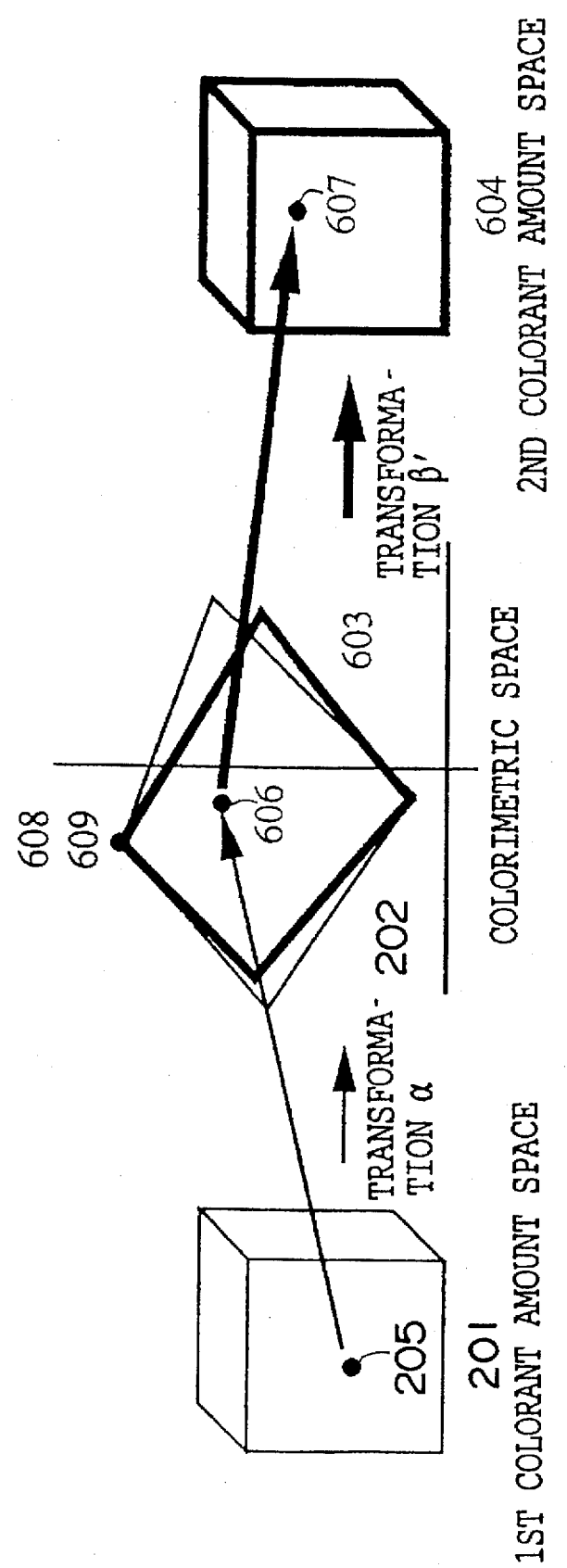
FIG. 6 is a conceptual diagram explaining the colorant-amount transforming method in accordance with the present invention for transforming colorant amounts by using the above-described second method.
Figure 11:
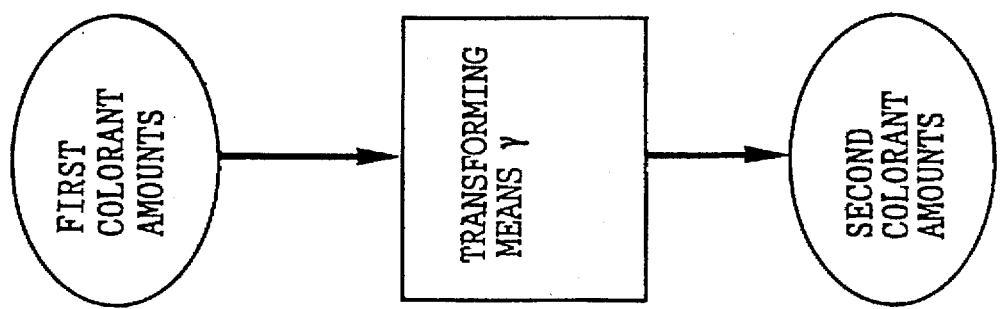
FIG. 11 is a block diagram in a case where the transforming means in FIG. 1 are formed as a single transforming means.

The estimation of the Lab values was effected as follows: As shown in FIG. 3, tristimulus values KaWb(i) in which the tristimulus values Wb(i) of the newspaper itself were multiplied by a contribution rate Ka were added to tristimulus values RA(i)–KaWa(i) obtained by subtracting from the tristimulus values RA(i) of the chart image 1 formed by the proofing printing machine tristimulus values KaWa(i) in which the tristimulus values Wa(i) of the proofing printing machine itself of the chart image 1 were multiplied by the contribution rate Ka. Thus tristimulus values were obtained in which portions of contribution of the chart image 1 were replaced by tristimulus values of the newspaper in accordance with a contribution rate, and these tristimulus values were transformed into Lab values.

In this way, a simulation image in a case where the image of the CMY values 501 was printed on newspaper was transformed into the RGB values 520 for displaying on the color monitor, by means of the flow which was comprised of the CMY values 501, the transforming means 522, the Lab values 503, the transforming means 524, and the RGB values 520.

By means of these RGB values 520, the color correction of the CMY values 501 was carried out by an image correcting means 532 until the simulation image was reproduced to a desirable color while confirming the simulation image being displayed on an image displaying means constituted by an unillustrated CRT. The CMY values 520 corresponding to the color correction could be displayed on the CRT to effect a simulation.

Figure 17:
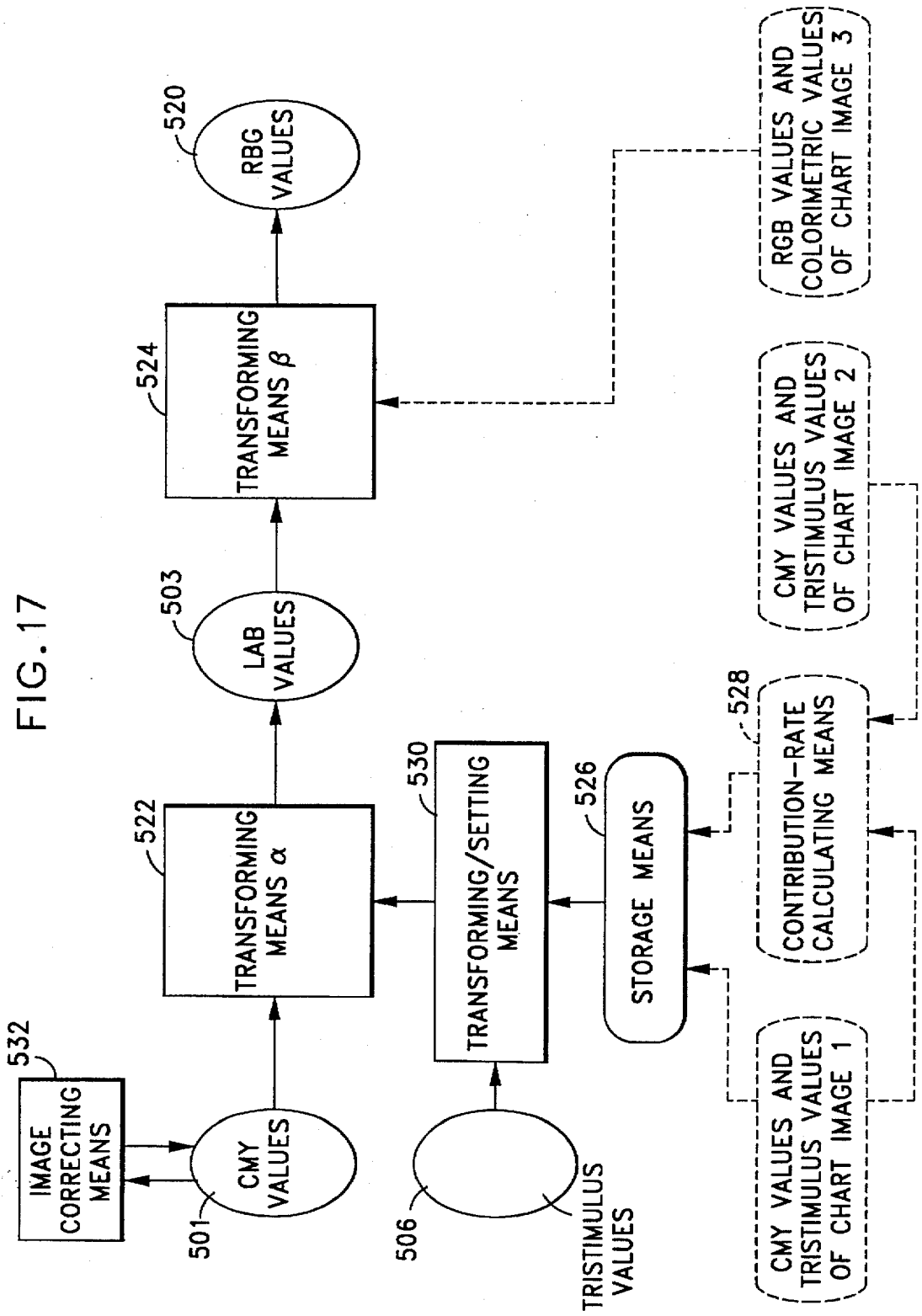
FIG. 17 is a block diagram in accordance with a fourth embodiment in which tristimulus values are used.
Figure 18:
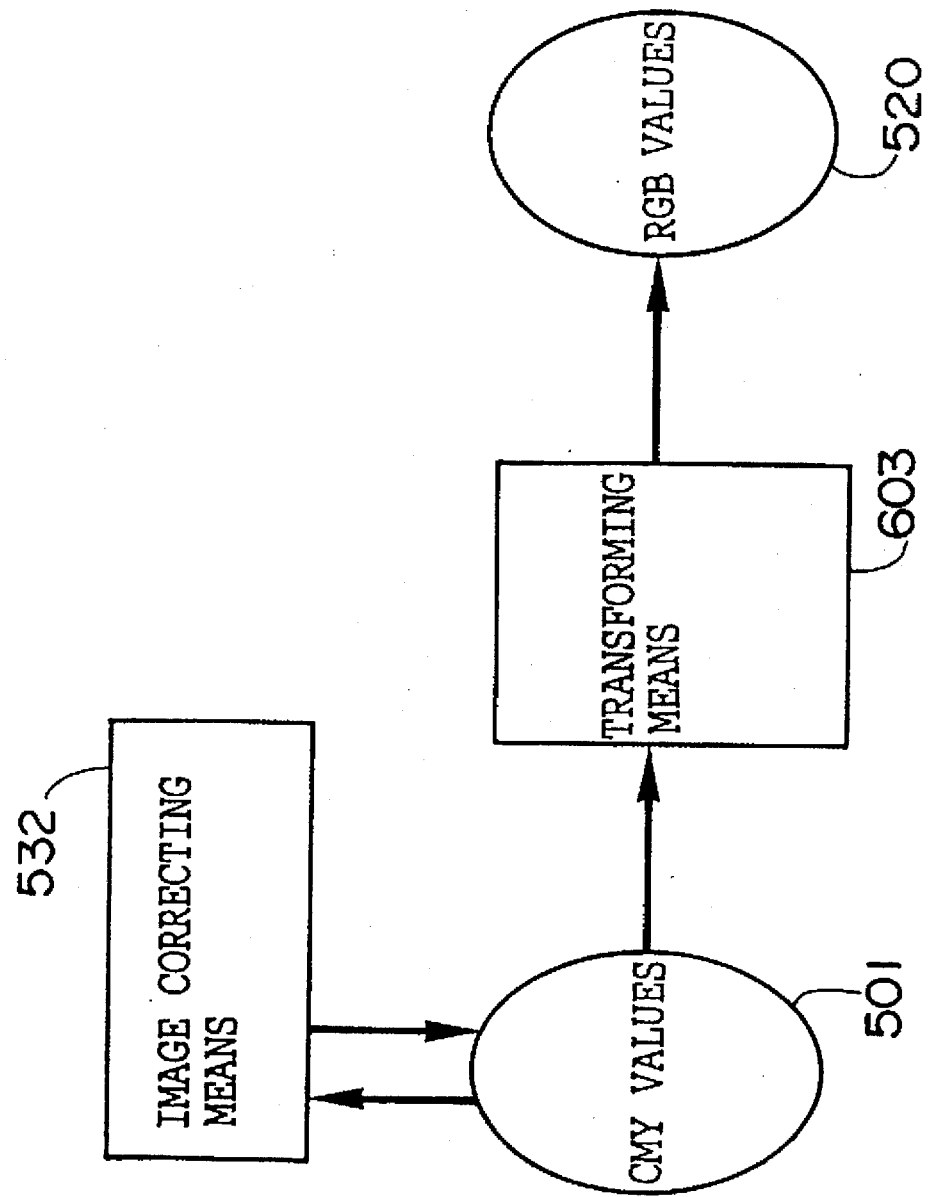
FIG. 18 is a block diagram in a case where the transforming means in FIG. 17 are formed as a single transforming means.

In addition, in a case where the paper on which the simulation is to be performed and the color monitor are each restricted to one kind, the transforming means 522 and 524 in FIG. 17 may be simplified by being constituted by a single transforming means 603, as shown in FIG. 18.

Figure 19:
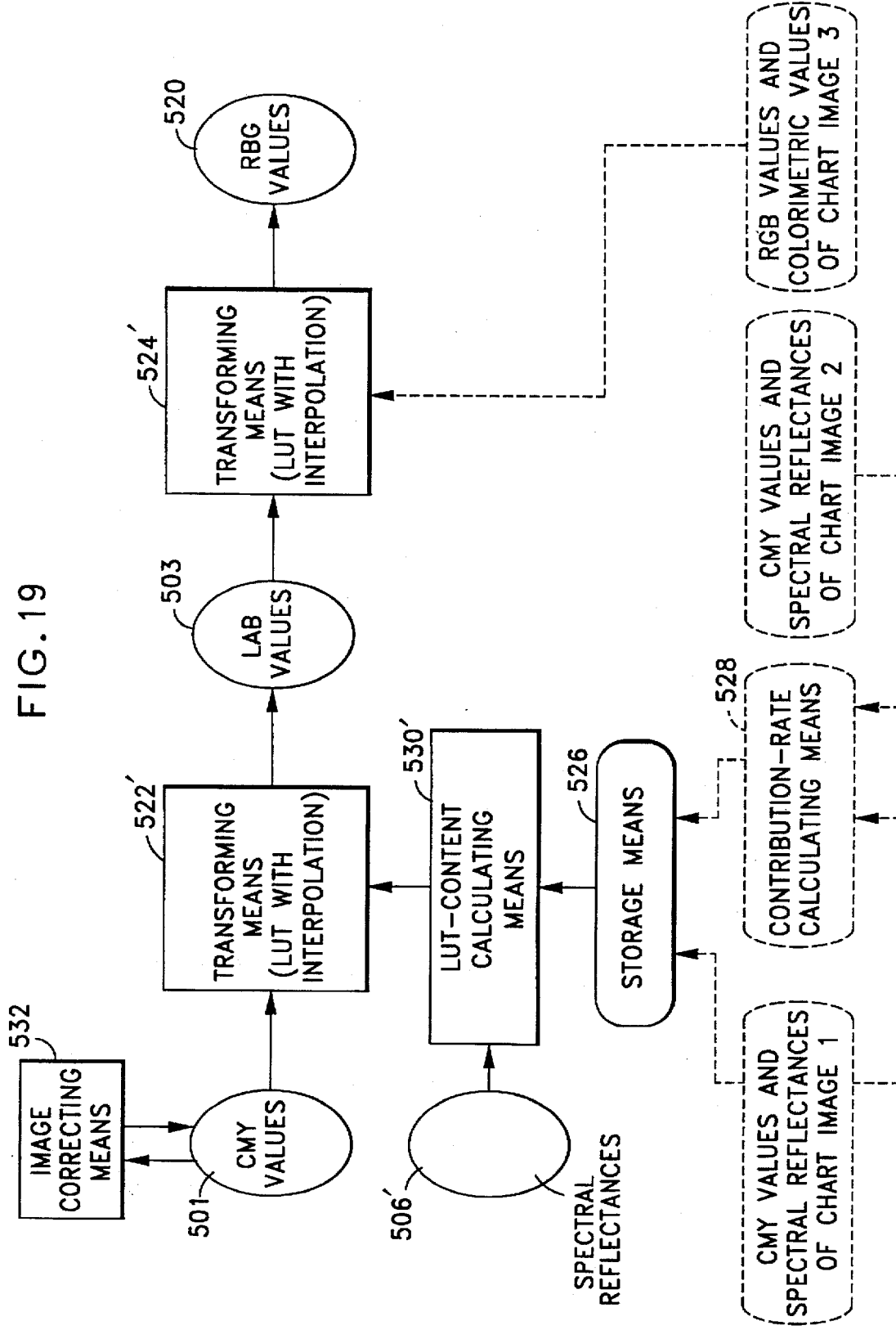
FIG. 19 is a block diagram in a case where the tristimulus values in the fourth embodiment are changed to spectral reflectances.

Although, in the above-described embodiment, a description has been given of an example in which tristimulus values were used, spectral reflectances may be used instead of the tristimulus values. FIG. 19 shows an example in which the respective transforming means were constituted by LUTs with interpolations instead of the neural networks, and spectral reflectances were used instead of the tristimulus values. In FIG. 19, the same portions as those in FIG. 17 are detonated by the same reference numerals, portions that correspond to those in FIG. 17 are denoted by the same reference numerals with dash, and a description thereof will be omitted. In this case as well, the transforming means may be constituted by neural networks instead of the LUTs with interpolations. Additionally, in a case where the paper on which the simulation is to be performed and the color monitor are each restricted to one kind, the transforming means in FIG. 19 may be simplified by being constituted by a single transforming means 603', as shown in FIG. 20.

In accordance with the above-described embodiment for effecting a simulation, when the relationships between the colorant amounts used in the proofing printing machine and the colorimetric values of an image formed with these colorant amounts, as well as a contribution rate of the tristimulus values (or spectral reflectances) of the printing sheet itself used in the proofing printing machine, are already known, it is possible to accurately simulate the color in the case where an image is formed on arbitrary newspaper, and reproduce the image on an image displaying device or a color printer concerning which the relationships between the colorant amounts and the colorimetric values are already known.

What is claimed is:

1. A colorant-amount transforming method for transforming a first colorant amount for forming an image on a first medium into a second colorant amount for forming the image on a second medium whose colorimetric value differs from that of the first medium, comprising the steps of:

(a) transforming the colorant amount subject to transformation into a colorimetric value by a first transformation for transforming the first colorant amount into a colorimetric value corresponding to one of a tristimulus value and a spectral reflectance in which a portion of contribution of one of the tristimulus value and the spectral reflectance of the first medium itself to one of the tristimulus value and the spectral reflectance of the image formed on the first medium with the first colorant amount is replaced by one of the tristimulus value and the spectral reflectance of the second medium itself in accordance with a contribution rate; and (b) transforming the colorimetric value obtained by the transformation in step (a) into a colorant amount targeted in the transformation by a second transformation in which the colorimetric value of the image formed on the second medium with the second colorant amount is transformed into the second colorant amount.

2. A colorant-amount transforming method according to claim 1, wherein the colorimetric value in the first transformation in step (a) is a colorimetric value corresponding to one R'a of the tristimulus value and the spectral reflectance which is given by the following formula:

$$R'a = RA + Ka(Wb - Wa)$$

where,

RA is one of the tristimulus value and the spectral reflectance of the image formed on the first medium with the first colorant amount, Ka is the contribution rate, Wa is one of the tristimulus value and the spectral reflectance of the first medium itself, and Wb is one of the tristimulus value and the spectral reflectance of the second medium itself.

3. A colorant-amount transforming method according to claim 1, wherein when a first colorant for forming the image on the first medium is of n kinds, and each of colorant amounts thereof ranges in steps of from a1 to an %, the contribution rate Ka is given by the following formula:

$$Ka = (1 - a_1/100) \times (1 - a_2/100) \, x \ldots x \, (1 - a_n/100).$$

4. A colorant-amount transforming method according to claim 1, wherein the contribution rate Ka is given by the following formula:

$$Ka=(Ra-Rb)/(Wa-Wb)$$

where,

Ra is one of the tristimulus value and the spectral reflectance of the image formed on the first medium with a predetermined colorant amount, Rb is one of the tristimulus value and the spectral reflectance of the image formed on the second medium with a predetermined colorant amount, Wa is one of the tristimulus value and the spectral reflectance of the first medium itself, and Wb is one of the tristimulus value and the spectral reflectance of the second medium itself.

5. A colorant-amount transforming method according to claim 1, wherein in a case where the image is formed by an area gradation method, the contribution rate is given by a ratio of an area of a portion of the first medium not covered with the colorant to an overall area of the first medium.

6. A colorant-amount transforming method according to claim 1, wherein, in step (a), the colorant amount subject to transformation is transformed into a colorimetric value corresponding to one of the tristimulus value and the spectral reflectance in which the portion of contribution of one of the tristimulus value and the spectral reflectance of the first medium itself to one of the tristimulus value and the spectral reflectance of the image formed on the first medium with the first colorant amount is replaced by one of the tristimulus value and the spectral reflectance of a third medium itself in accordance with the contribution rate.

7. A colorant-amount transforming method according to claim 6, wherein, in step (b), the colorimetric value obtained by the transformation in step (a) is transformed into a colorant amount for displaying on an image displaying device, by the second transformation for transforming into the second colorant amount the colorimetric value of the image formed on the second medium with the second colorant amount.

8. A colorant-amount transforming method according to claim 6, wherein the first colorant amount in step (a) is made correctable.

9. A colorant-amount transforming method for transforming a first colorant amount for forming an image on a first medium into a second colorant amount for forming the image on a second medium whose colorimetric value differs from that of the first medium, comprising the steps of:

(a) transforming the colorant amount subject to transformation into a colorimetric value by a first transformation for transforming the first colorant amount into a colorimetric value of the image formed on the first medium with the first colorant amount; and (b) transforming the colorimetric value obtained by the transformation in step (a) into a colorant amount targeted in the transformation by a second transformation for transforming into the second colorant amount a colorimetric value corresponding to one of a tristimulus value and a spectral reflectance in which a portion of contribution of one of the tristimulus value and the spectral reflectance of the second medium itself to one of the tristimulus value and the spectral reflectance of the image formed on the second medium with the second colorant amount is replaced by one of the tristimulus value and the spectral reflectance of the first medium itself in accordance with a contribution rate.

10. A colorant-amount transforming method according to claim 9, wherein the colorimetric value in the second transformation in step (b) is a colorimetric value corresponding to one R'b of the tristimulus value and the spectral reflectance which is given by the following formula:

$$R'b=RB+Kb(Wa-Wb)$$

where,

RB is one of the tristimulus value and the spectral reflectance of the image formed on the second medium with the second colorant amount, Kb is the contribution rate, Wa is one of the tristimulus value and the spectral reflectance of the first medium itself, and Wb is one of the tristimulus value and the spectral reflectance of the second medium itself.

11. A colorant-amount transforming method according to claim 9, wherein when a second colorant for forming the image on the second medium is of m kinds, and each of colorant amounts thereof ranges in steps of from $b_1$ to $b_m$ %, the contribution rate Kb is given by the following formula:

$$Kb=(1-b_1/100)\times(1-b_2/100) \ldots \times (1-b_m/100).$$

12. A colorant-amount transforming method according to claim 9, wherein the contribution rate Kb is given by the following formula:

$$Kb=(Ra-Rb)/(Wa-Wb)$$

where,

Ra is one of the tristimulus value and the spectral reflectance of the image formed on the first medium with a predetermined colorant amount, Rb is one of the tristimulus value and the spectral reflectance of the image formed on the second medium with a predetermined colorant amount, Wa is one of the tristimulus value and the spectral reflectance of the first medium itself, and Wb is one of the tristimulus value and the spectral reflectance of the second medium itself.

13. A colorant-amount transforming method according to claim 9, wherein in a case where the image is formed by an area gradation method, the contribution rate is given by a ratio of an area of a portion of the second medium not covered with the colorant to an overall area of the second medium.

14. A colorant-amount transforming method according to claim 9, wherein, in step (b), a colorimetric value, corresponding to one of the tristimulus value and the spectral reflectance in which the portion of contribution of one of the tristimulus value and the spectral reflectance of the second medium itself to one Of the tristimulus value and the spectral reflectance of the image formed on the second medium with the second colorant amount is replaced by one of the tristimulus value and the spectral reflectance of a third medium itself in accordance with the contribution rate, is transformed into a colorant amount targeted in the transformation.

15. A colorant-amount transforming method for transforming a first colorant amount for forming an image on a first medium into a second colorant amount for forming the image on a second medium whose colorimetric value differs from that of the first medium, comprising the steps of:

(a) transforming the colorant amount subject to transformation into a colorimetric value by a first transformation for transforming the first colorant amount into a colorimetric value corresponding to one of a tristimulus value and a spectral reflectance in which a portion of contribution of one of the tristimulus value and the spectral reflectance of the first medium itself to one of the tristimulus value and the spectral reflectance of the image formed on the first medium with the first colorant amount is replaced by one of the tristimulus value and the spectral reflectance of some standard white in accordance with a contribution rate; and (b) transforming the colorimetric value obtained by the transformation in step (a) into a colorant amount targeted in the transformation by a second transformation for transforming into the second colorant amount a colorimetric value corresponding to one of a tristimulus value and a spectral reflectance in which a portion of contribution of one of the tristimulus value and the spectral reflectance of the second medium itself to one of the tristimulus value and the spectral reflectance of the image formed on the second medium with the second colorant amount is replaced by one of the tristimulus value and the spectral reflectance of the white used in step (a) in accordance with a contribution rate.

* * * * *